US011317556B2

(12) United States Patent
Karst et al.

(10) Patent No.: US 11,317,556 B2
(45) Date of Patent: May 3, 2022

(54) METHOD OF CONTROLLING A DIFFERENTIAL MOTOR TORQUE STEERING SYSTEM OF A WORKING MACHINE AND SYSTEM THEREOF

(71) Applicant: DEERE & COMPANY, Moline, IL (US)

(72) Inventors: Austin J. Karst, Ottumwa, IA (US); Jason J. Wanner, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 64 days.

(21) Appl. No.: 17/011,078

(22) Filed: Sep. 3, 2020

(65) Prior Publication Data

US 2022/0061205 A1   Mar. 3, 2022

(51) Int. Cl.
*A01B 69/00* (2006.01)
*B62D 6/00* (2006.01)
*A01B 63/12* (2006.01)

(52) U.S. Cl.
CPC ............ *A01B 69/007* (2013.01); *A01B 63/12* (2013.01); *B62D 6/00* (2013.01)

(58) Field of Classification Search
CPC .................................................. A01B 69/007
See application file for complete search history.

(56) References Cited

U.S. PATENT DOCUMENTS

| | | | |
|---|---|---|---|
| 3,005,562 A * | 10/1961 | Shaffer ...................... | B66F 9/22 414/635 |
| 6,580,989 B1 | 6/2003 | Husain et al. | |
| 6,929,086 B1 | 8/2005 | Husain et al. | |
| 7,648,002 B2 * | 1/2010 | Easton ................. | B62D 11/183 180/408 |
| 8,496,256 B2 | 7/2013 | Bebernes et al. | |
| 9,457,841 B2 * | 10/2016 | Smith ...................... | F16H 61/44 |
| 9,873,449 B2 * | 1/2018 | Magisson ................ | B62D 5/04 |
| 2016/0304116 A1 * | 10/2016 | Magisson ............... | G01S 19/13 |

(Continued)

FOREIGN PATENT DOCUMENTS

| | | | |
|---|---|---|---|
| CN | 201713267 U | * | 1/2011 |
| CN | 203698523 U | * | 7/2014 |
| CN | 105241678 A | * | 1/2016 |

(Continued)

*Primary Examiner* — Shelley Chen
(74) *Attorney, Agent, or Firm* — Taft Stettinius & Hollister LLP; Stephen F. Rost

(57) ABSTRACT

A steering system for controlling an agricultural machine having a pair of front and rear wheels includes a controller and a steer input sensor for detecting a change in an operator steer input corresponding to a steer command. The system includes a displacement input for communicating a motor displacement associated with an operating mode. A primary differential steering system includes a drive motor for operably controlling the pair of front wheels and a secondary steering system controls the pair of rear wheels. The controller determines if the motor displacement is being controlled according to a first motor displacement or a second motor displacement, and outputs a control signal to actuate first and second actuators as a function of the steer command. The control signal includes a rear steering gain that is a function of machine speed and either the first motor displacement or the second motor displacement.

20 Claims, 16 Drawing Sheets

(56) References Cited

U.S. PATENT DOCUMENTS

2017/0280626 A1  10/2017  Bertino

FOREIGN PATENT DOCUMENTS

| EP | 2930086 A2 | * | 10/2015 | ............. | B62D 11/04 |
| JP | H0183673 U | * | 6/1989 | | |
| JP | 2000025633 A | * | 1/2000 | ........... | B60K 28/165 |
| JP | 2007283986 A | * | 11/2007 | ............. | B60K 17/30 |

* cited by examiner

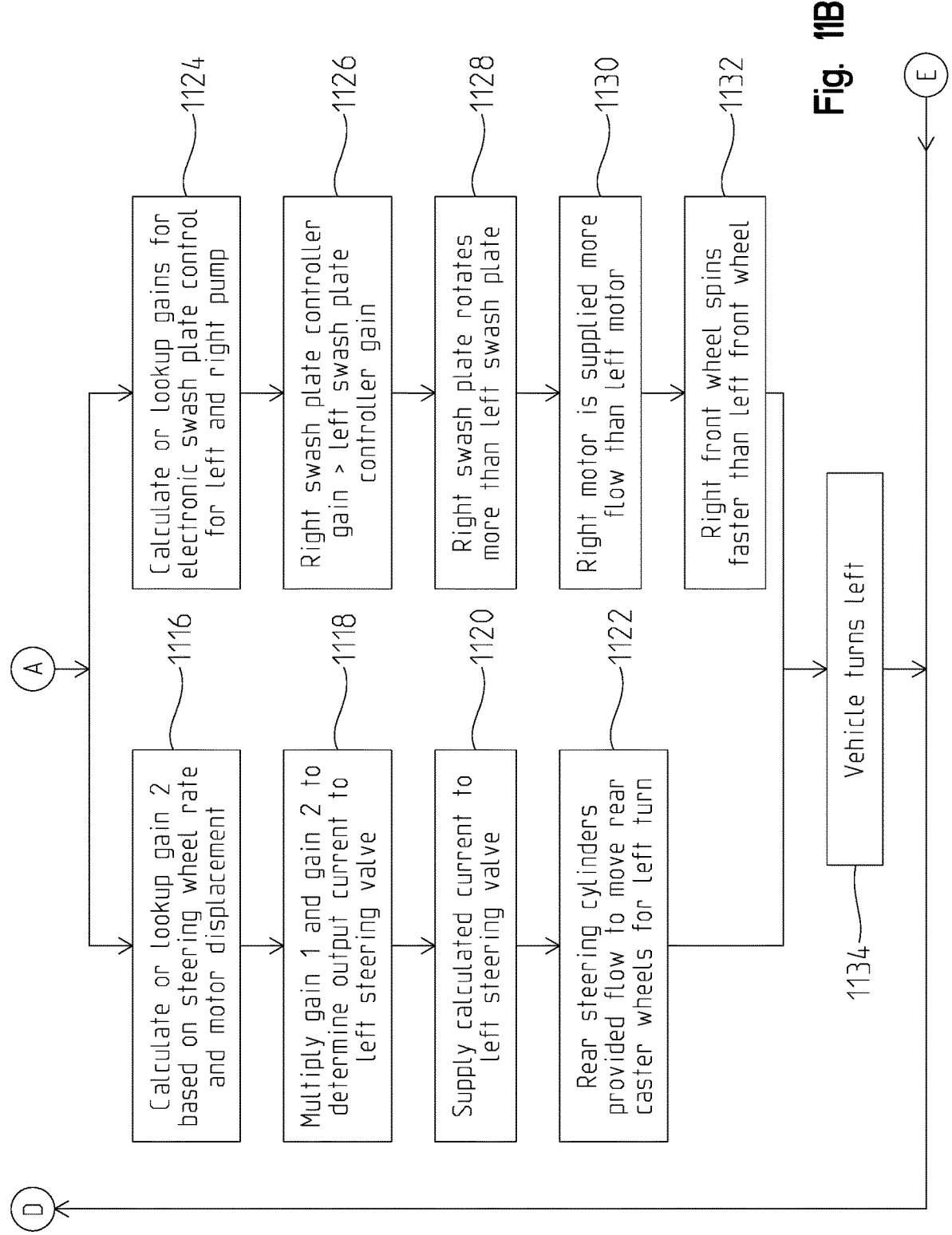

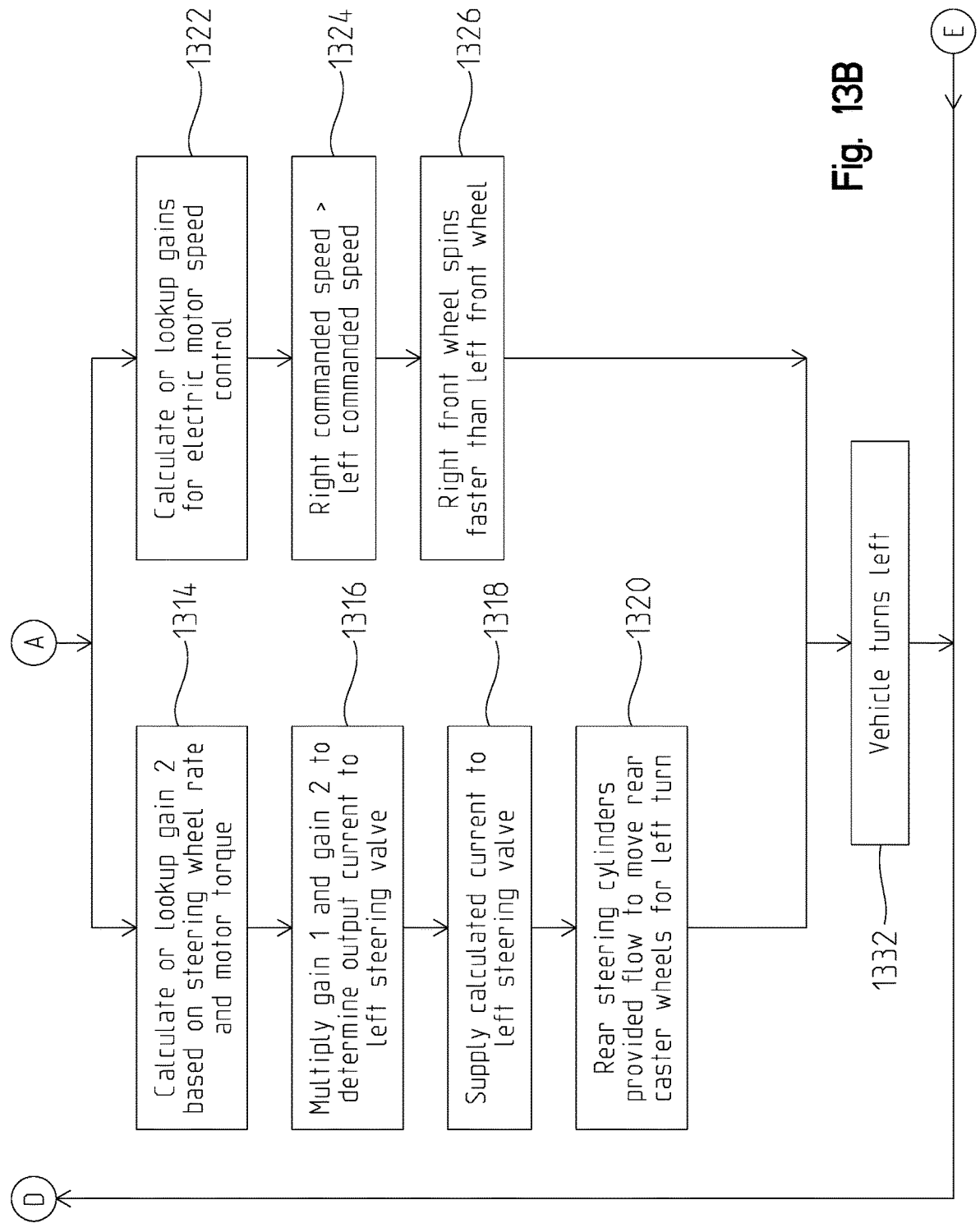

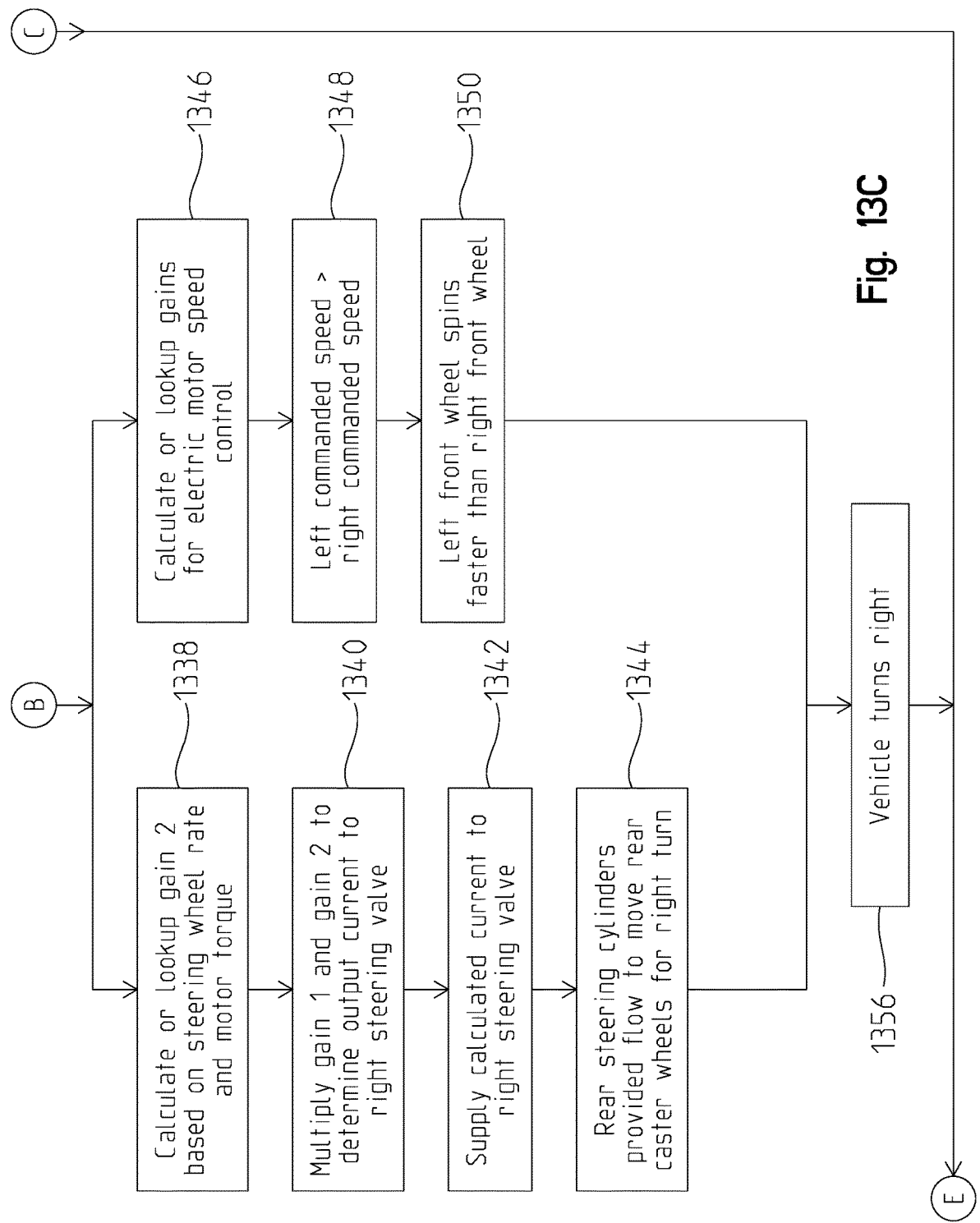

METHOD OF CONTROLLING A DIFFERENTIAL MOTOR TORQUE STEERING SYSTEM OF A WORKING MACHINE AND SYSTEM THEREOF

FIELD OF THE DISCLOSURE

The disclosure generally relates to a working machine, and in particular to a method of controlling a steering system of a working machine.

BACKGROUND

Some agricultural machines, such as but not limited to self-propelled windrowers, are driven through a dual-path hydrostatic system. Speed changes are made by adjusting the speed of both front drive wheels simultaneously. Primary steering or direction changes are made by adjusting the relative speed of the front drive wheels. Rear steering systems are also commonly used on agricultural machines including self-propelled windrows. The rear wheels of such machines may be caster wheels to allow the machine to pivot during direction changes.

Caster wheels are typically carried by a frame of the vehicle, and are free to rotate about a generally vertical axis three hundred sixty degrees (360°). The caster wheel assembly typically includes a shaft defining an axis of rotation, a fork rigidly attached to the bottom end of the shaft, and a caster wheel coupled with the distal ends of the fork.

In order to improve steerability of such vehicles, the vehicle may be equipped with a rear steering system for controlling the rear caster wheels in conjunction with a primary steering system to provide faster steering inputs while turning and improve the ability to hold a straight line. The system may also provide the capability to be inactive while allowing the rear wheels to move freely when subjected to ground inputs.

SUMMARY

In one embodiment of the present disclosure, a steering system for controlling an agricultural machine having a front traction mechanism (e.g., a pair of front wheels) and a pair of rear wheels, includes a controller; a steer input sensor in communication with an operator steer input and the controller, the steer input sensor configured to detect a change in the operator steer input corresponding to a steer command; a displacement input in communication with the controller for communicating a first motor displacement associated with a first operating mode and a second motor displacement associated with a second operating mode; a speed sensor for detecting a machine speed, the speed sensor disposed in communication with the controller; a primary differential steering system including a drive motor for operably controlling the pair of front wheels, the drive motor being selectively operable according to the first motor displacement and the second motor displacement; and a secondary steering system for operably controlling the pair of rear wheels, the secondary steering system comprising a first actuator for controlling a first rear wheel of the pair of rear wheels and a second actuator for controlling a second rear wheel of the pair of rear wheels; wherein, the controller determines if the motor displacement is being controlled according to the first motor displacement or the second motor displacement; further wherein, the controller outputs a control signal to operably actuate the first and second actuators as a function of the steer command, wherein the control signal comprises a rear steering gain that is a function of machine speed and either the first motor displacement or the second motor displacement.

In one example of this embodiment, the controller outputs a second control signal to operably control the primary differential steering system based on the steer command. In a second example, the primary differential steering system comprises a first pump and a first motor for operably controlling a first front wheel of the pair of front wheels; a second pump and a second motor for operably controlling a second front wheel of the pair of front wheels; a steering actuator disposed in communication with the controller; and a mechanical mechanism for varying a displacement of the first and second pumps based on the second control signal.

In a third example, the primary differential steering system comprises a first pump and a first motor for operably controlling a first front wheel of the pair of front wheels; and a second pump and a second motor for operably controlling a second front wheel of the pair of front wheels; wherein, the controller determines a gain for an electronic swash plate control for each of the first and second pumps; further wherein, the second control signal comprises a first portion of flow to the first motor and a second portion of flow to the second motor as a function of the gain. In a fourth example, the first and second actuators are operably controlled independently from one another. In a fifth example, the rear steering gain comprises a first linear steering gain profile and a second linear steering gain profile, the first linear steering gain profile associated with the first motor displacement and the second linear steering gain profile associated with the second motor displacement.

In a sixth example, a slope of the first linear steering gain profile decreases as machine speed increases; and a slope of the second linear steering gain profile increases as machine speed increases. In a seventh example, the rear steering gain comprises a first non-linear steering gain profile and a second non-linear steering gain profile, the first non-linear steering gain profile associated with the first motor displacement and the second non-linear steering gain profile associated with the second motor displacement. In an eighth example, the rear steering gain decreases as machine speed increases according to the first non-linear steering gain profile; and the rear steering gain increases as machine speed increases according to the second non-linear steering gain profile.

In a ninth example, the controller outputs a second control signal to operably control the primary differential steering system based on the steer command, the second control signal comprising a front steering gain that is a function of machine speed and either the first motor displacement or the second motor displacement; further wherein, the front steering gain comprises a third non-linear steering gain profile and a fourth non-linear steering gain profile, the third non-linear steering gain profile associated with the first motor displacement and the fourth non-linear steering gain profile associated with the second motor displacement.

In a tenth example, at any given machine speed, a slope of the first non-linear steering gain profile is approximately the same as a slope of the third non-linear steering gain profile, and a slope of the second non-linear steering gain profile is approximately the same as a slope of the fourth non-linear steering gain profile. In an eleventh example, the rear steering gain comprises a non-linear steering gain profile having a first portion and a second portion, the first portion associated with the first motor displacement and the second portion associated with the second motor displacement.

In a twelfth example of this embodiment, the controller operably adjusts the rear steering gain between the first portion and the second portion at a pre-defined machine speed. In a thirteenth example, the rear steering gain decreases as machine speed increases according to the first portion of the non-linear steering gain profile; and the rear steering gain increases as machine speed increases according to the second portion of the non-linear steering gain profile.

In another embodiment of the present disclosure, a method of controlling a steering motion of an agricultural machine includes providing the agricultural machine with a controller, a steering wheel, a steer input sensor, a machine speed sensor, a motor displacement input, a prime mover for propelling the machine in a travel direction, a primary differential steering system for operably controlling a pair of front wheels, and a secondary steering system comprising a first actuator for controlling a first rear wheel and a second actuator for controlling a second rear wheel; detecting a machine speed with the machine speed sensor, a position of the steering wheel with the steer input sensor, and a motor displacement level from the motor displacement input; determining a first gain value as a function of the machine speed and motor displacement level; determining a steer command from the position of the steering wheel, the steer command comprising a first steer direction and a first steer rate; determining a second gain value based on the motor displacement level and first steer rate; calculating a control signal based on the first gain value and the second gain value; outputting the control signal to a steering valve of the secondary steering system, wherein the control signal comprises a rear steering gain that is a function of machine speed and the motor displacement level; actuating the first and second actuators based on the control signal; and operably controlling the first and second rear wheels to cause the steering motion of the agricultural machine.

In one example of this embodiment, the method includes determining if the motor displacement level corresponds with a first motor displacement associated with a first operating mode or a second motor displacement associated with a second operating mode. In a second example, the method includes the outputting step comprises outputting the control signal based on a first linear steering gain profile associated with the first motor displacement; outputting the control signal based on a second linear steering gain profile associated with the second motor displacement. In a third example, the method includes the outputting step comprises outputting the control signal based on a first non-linear steering gain profile associated with the first motor displacement; outputting the control signal based on a second non-linear steering gain profile associated with the second motor displacement.

In a fourth example, the method includes outputting a second control signal by the controller to operably control the primary differential steering system based on the steer command, the second control signal comprising a front steering gain that is a function of machine speed and either the first motor displacement or the second motor displacement. In a fifth example, the front steering gain comprises a third non-linear steering gain profile and a fourth non-linear steering gain profile, the third non-linear steering gain profile associated with the first motor displacement and the fourth non-linear steering gain profile associated with the second motor displacement.

In a sixth example, the method includes the outputting step comprises outputting the control signal having a non-linear rear steering gain profile having a first portion and a second portion, the first portion associated with the first motor displacement and the second portion associated with the second motor displacement. In a seventh example, the method includes providing the differential steering system with a first pump, a first electric motor, a second pump, and a second electric motor; determining a gain for a first electronic swash plate control of the first pump and a second electronic swash plate control of the second pump; supplying more flow to the first electric motor than the second electric motor; and rotating a first front wheel of the pair of front wheels by the first electric motor and a second front wheel of the pair of front wheels by the second electric motor, where the first front wheel rotates faster than the second front wheel.

In a further embodiment of the present disclosure, a steering system for controlling an agricultural machine having a pair of front wheels and a pair of rear wheels, includes a controller; a steer input sensor in communication with an operator steer input and the controller, the steer input sensor configured to detect a change in the operator steer input corresponding to a steer command; a displacement input in communication with the controller for communicating a first motor displacement associated with a first operating mode and a second motor displacement associated with a second operating mode; a speed sensor for detecting a machine speed, the speed sensor disposed in communication with the controller; a primary differential steering system including a drive motor for operably controlling the pair of front wheels, the drive motor being selectively operable according to the first motor displacement and the second motor displacement; and a secondary steering system for operably controlling the pair of rear wheels, the secondary steering system comprising a first actuator for controlling a first rear wheel of the pair of rear wheels and a second actuator for controlling a second rear wheel of the pair of rear wheels; wherein, the controller determines if the motor displacement is being controlled according to the first motor displacement or the second motor displacement; wherein, the controller outputs a first control signal to operably actuate the first and second actuators as a function of the steer command, wherein the control signal comprises a rear steering gain that is selected from a first steering gain profile or a second steering gain profile, the first and second rear steering profiles being a function of machine speed and either the first motor displacement or the second motor displacement; further wherein, the controller outputs a second control signal to operably control the primary differential steering system based on the steer command.

In one example of this embodiment, the first steering profile comprises a linear steering profile based on machine speed and the first motor displacement; the second steering profile comprises a linear steering profile based on machine speed and the second motor displacement. In a second example, a slope of the first steering profile decreases as machine speed increases; and a slope of the second steering profile increases as machine speed increases. In a third example, the first steering profile comprises a non-linear steering profile based on machine speed and the first motor displacement; the second steering profile comprises a non-linear steering profile based on machine speed and the second motor displacement. In a fourth example, a slope of the first steering profile decreases as machine speed increases; and a slope of the second steering profile increases as machine speed increases.

In a fifth example, the second control signal comprises a front steering gain that is a function of machine speed and either the first motor displacement or the second motor displacement; further wherein, the front steering gain comprises a third non-linear steering gain profile and a fourth non-linear steering gain profile, the third non-linear steering gain profile associated with the first motor displacement and the fourth non-linear steering gain profile associated with the second motor displacement. In another example, at any given machine speed, a slope of the first non-linear steering gain profile is approximately the same as a slope of the third non-linear steering gain profile, and a slope of the second non-linear steering gain profile is approximately the same as a slope of the fourth non-linear steering gain profile.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIGS. 11A-C is another flow diagram of a method of controlling a front and rear steering system of the agricultural machine of FIG. 1;

FIGS. 13A-C is a flow diagram of a method of controlling the front steering system of FIG. 12 and a rear steering system of the agricultural machine of FIG. 1.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
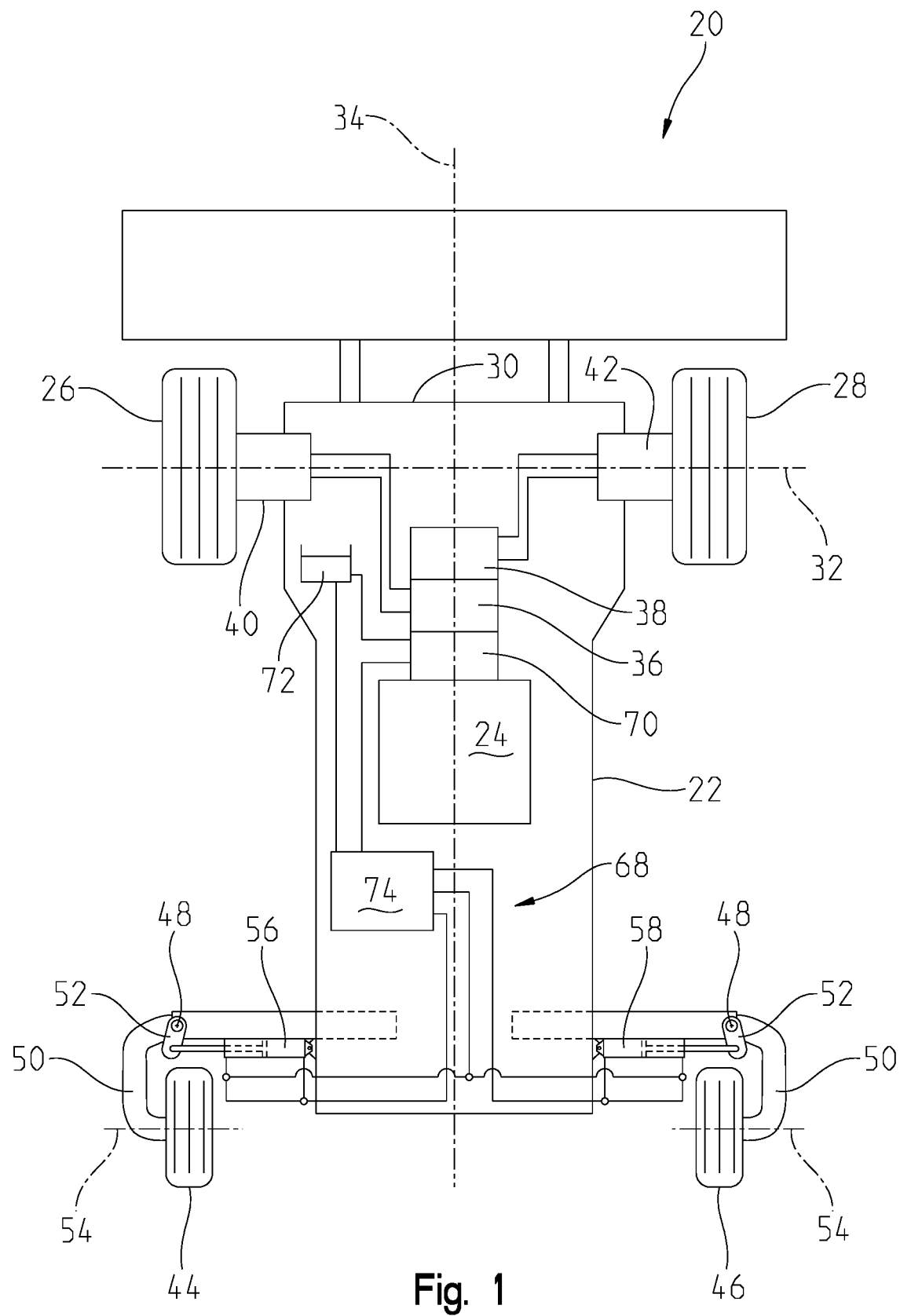
FIG. 1 is a schematic plan view of an agricultural machine.

Referring to the Figures, wherein like numerals indicate like parts throughout the several views, an agricultural machine is generally shown at 20 in FIG. 1. The example embodiment of the agricultural machine 20 shown in FIG. 1 includes, but is not limited to, a self-propelled windrower. However, it should be appreciated that the teachings of this disclosure may be applied to machines other than the windrower depicted in FIG. 1.

Referring to FIG. 1, the agricultural machine 20 includes a frame 22, which supports a prime mover 24. The prime mover 24 may include, but is not limited to, an internal combustion engine, an electric motor, a combination of both, or some other device capable of generating torque to power the agricultural machine 20. A left front drive wheel 26 and a right front drive wheel 28 are each mounted to the frame 22, adjacent a forward end 30 of the frame 22. The left front drive wheel 26 and the right front drive wheel 28 are rotatable about a transverse axis 32. The transverse axis 32 is generally perpendicular to a longitudinal axis 34 of the frame 22. The left front drive wheel 26 and the right front drive wheel 28 may form a front traction mechanism. In an alternative embodiment, the pair of front drive wheels may be replaced by a pair of tracks thus forming the traction mechanism. For sake of the illustrated embodiment of FIG. 1, however, the front traction mechanism will be described as including a pair of front drive wheels.

A first drive pump 36 and a second drive pump 38 are coupled to and driven by the prime mover 24. The first drive pump 36 supplies pressurized fluid to a first hydraulic motor 40. The first hydraulic motor 40 is coupled to the left front drive wheel 26 and operable to rotate the left front drive wheel 26 to propel the agricultural machine 20. The second drive pump 38 supplies pressurized fluid to a second hydraulic motor 42. The second hydraulic motor 42 is coupled to the right front drive wheel 28 and operable to rotate the right front drive wheel 28 to propel the agricultural machine 20. In this embodiment, the left and right front drive wheels 26, 28 are rotatably driven by independent closed-loop system including the aforementioned pump and motor.

As understood by those skilled in the art, the left front drive wheel 26 and the right front drive wheel 28 may be simultaneously rotated in the same rotational direction and at the same rotational speed about the transverse axis 32 to drive the agricultural machine 20 forward or rearward, depending upon the direction of rotation. Additionally, the left front drive wheel 26 and the right front drive wheel 28 may be rotated in the same rotational direction at different rotational speeds about the transverse axis 32, or in opposite rotational directions at the same or different rotational speeds about the transverse axis 32, in order to turn the agricultural vehicle.

Moreover, the first drive pump 36 and the second drive pump 38 may be operably controlled by a controller 302 (see FIG. 3) to alter the displacement thereof to achieve differential steering in the front steering system. The displacement of each pump may be changed simultaneously or at different times. Further, the displacement may be varied at different rates to induce a steering motion.

The front or primary differential steering system may be controlled in one of a plurality of ways. First, the system may be actuator-controlled based on a steering wheel input or other operating steering input (OSI) 304 (see FIG. 3) to provide differential steering. This control may be physical via hydraulic flow or a mechanical linkage. For example, the differential steering at the drive pumps 36, 38 may be controlled by a mechanical mechanism such as a mechanical wishbone (not shown). When an operator turns a steering wheel or other operator steering input (OSI) 304 (see FIG. 3), hydraulic flow is diverted to the actuator (not shown) which actuates in a certain direction. As this happens, the mechanical wishbone rotates which induces differential swash plate angles resulting in a steering motion. The actuator may be controlled electronically relating steering wheel input to extension based on a steering wheel angle sensor (e.g., OSI sensor 306).

A second example is an electrical control system. Here, the controller 302 or other controller may interpret the steering column sensor (i.e., OSI sensor 306) signal to provide an electric current to the electronic swash plate controls on the pumps to verify the swash plate angle. Here, a left and right forward coils and left and right reverse coils may be provided. In yet another example, an electro-hydraulic control system may be used where the aforementioned mechanical mechanism is removed and electronic signals may be sent to an electronic displacement controller which will control the swash plate angle independently upon the control signal.

While the embodiment of FIG. 1 illustrates a hydraulic control system for the front differential steering system, it is further possible for the first and second drive pumps to be removed and the first and second hydraulic motors be replaced by electric motors. The electric motors may be independently controlled by a controller to vary speed and such to control a steering motion of the agricultural machine 20.

Due to the mass of the machine 20, there can be steering lag at the front drive wheels. To improve upon this lag, the agricultural machine may include a rear steering system which can steer a rear axle of the machine. Referring to FIG. 1, the agricultural machine 20 further includes a left rear caster wheel 44 and a right rear caster wheel 46 attached to the frame 22. As used herein, the term "caster wheel" should be understood to include a wheel that is able to rotate a full three hundred sixty degrees (360°) about a respective generally vertical axis 48. As such, each of the left rear caster wheel 44 and the right rear caster wheel 46 are rotatable a full three hundred sixty degrees (360°) about a respective generally vertical axis 48.

The left rear caster wheel 44 and the right rear caster wheel 46 may be attached to the frame 22 in a suitable manner. For example, as shown in FIG. 1, the caster wheels may be attached to the frame 22 via an arm 50. The arm 50 includes an upper shaft 52 that is rotatable about the generally vertical axis 48. The caster wheel is attached to lower distal end of the arm 50. Typically, a generally horizontal axis 54 of rotation of the wheel is longitudinally offset from the generally vertical axis 48, such that the caster wheel tends to follow behind the generally vertical axis 48. It should be appreciated that the right rear caster wheel 46 and the left rear caster wheel 44 may be attached to the frame 22 in some other manner than described herein.

Figure 2:
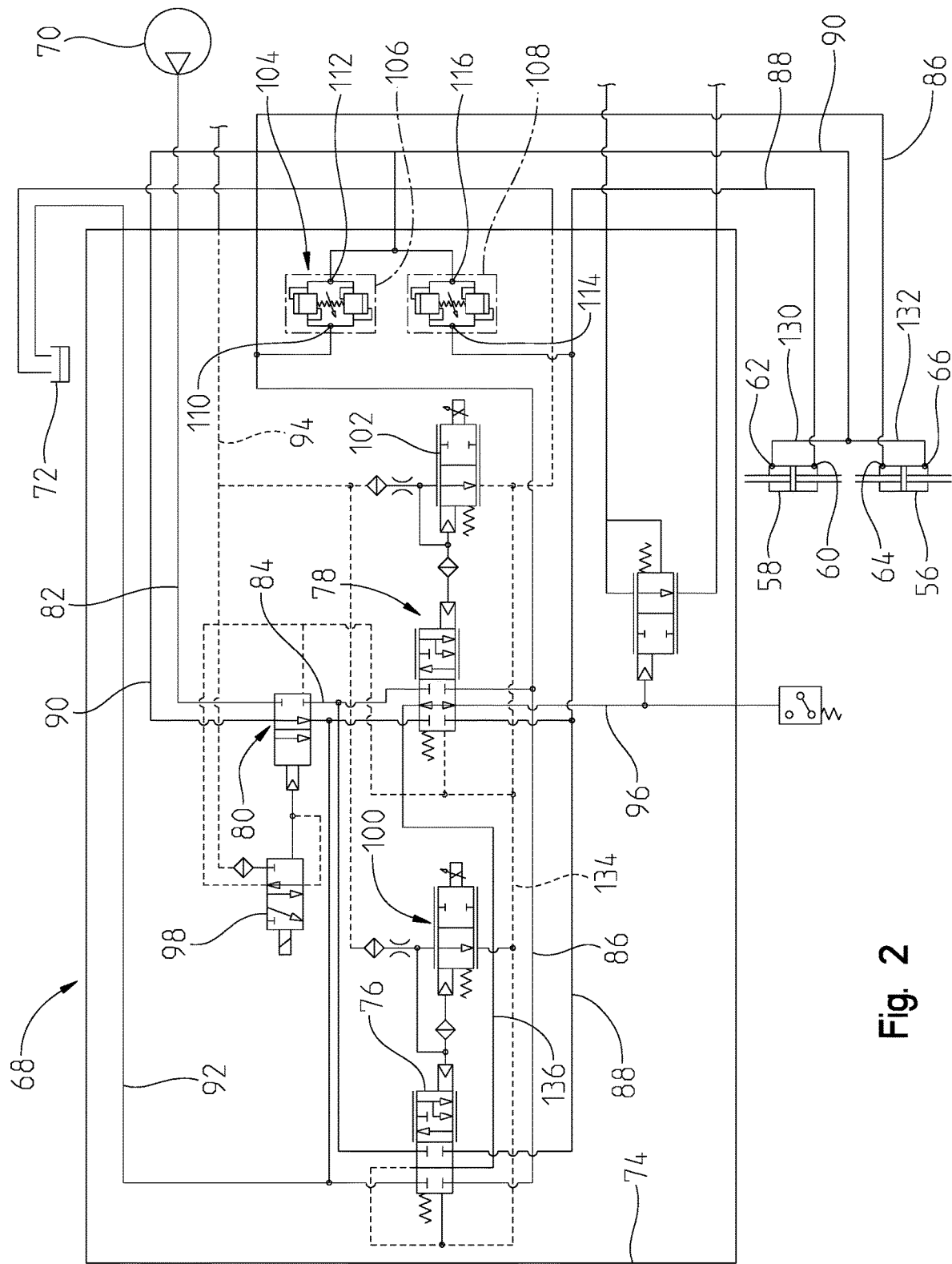
FIG. 2 is a schematic layout of a hydraulic system of the agricultural machine.

A left side actuator 56 interconnects the left rear caster wheel 44 and the frame 22, and is configured to control a position of the left rear caster wheel 44. Similarly, a right side actuator 58 interconnects the right rear caster wheel 46 and the frame 22, and is configured to control a position of the right rear caster wheel 46. In the example embodiment shown in FIG. 1 and described herein, each of the right side actuator 58 and the left side actuator 58 include a double acting hydraulic cylinder. As such, and as shown in FIG. 2, the right side actuator 58 includes an inboard port 60 and an outboard port 62 for receiving or discharging hydraulic fluid. Similarly, the left side actuator 58 includes an inboard port 64 and an outboard port 66 for receiving or discharging hydraulic fluid.

The agricultural machine 20 includes a hydraulic system for controlling the pair of steerable caster wheels, i.e., the left rear caster wheel 44 and the right rear caster wheel 46. While the left front drive wheel 26 and the right front drive wheel 28 provide the primary steering for the agricultural machine 20, the left rear caster wheel 44 and the right rear caster wheel 46 may be controlled to provide a steering assist and/or improve steering responsiveness under certain operating conditions. The hydraulic system connects the left side actuator 56 and the right side actuator 58 to provide a fluid tie rod therebetween. In other words, under certain operating conditions, the operation of the left rear caster wheel 44 and the right rear caster wheel 46 may be coupled together to provide a steering force to the agricultural machine 20, while in other operating conditions, the operation of the left rear caster wheel 44 and the right rear caster wheel 46 may be de-coupled to provide independent operation. Additionally, the hydraulic system allows hydraulic forces applied to the left side actuator 56 and the right side actuator 58 to be overcome or overridden by forces applied to the left rear caster wheel 44 and the right rear caster wheel 46 by the ground.

The hydraulic system includes a pressure source 70 configured to supply a flow of pressurized fluid. The pressure source 70 may include, but is not limited to, an auxiliary fluid pump that is drivenly coupled to the prime mover 24. The pressure source 70 draws fluid from a tank 72, and circulates the fluid through the hydraulic system 68. The tank 72 receives the fluid from the hydraulic system, stores the fluid, and supplies the fluid to the pressure source 70, e.g., an auxiliary fluid pump shown in FIG. 1.

Referring to FIG. 2, the hydraulic system 68 is shown schematically using standard American National Standards Institute (ANSI) hydraulic symbols to represent the various components of the example hydraulic system 68 therein. The hydraulic system 68 includes the pressure source 70 and the tank 72 described above, in combination with a valve block 74 and a plurality of fluid circuits described in greater detail below. It should be appreciated that the various fluid circuits described herein are defined fluid pathways or passages defined by the valve block 74, hard lines, flexible lines, fittings, connections, etc., that connect the various components and direct the fluid between components.

The valve block 74 includes a left steering command valve 76, a right steering command valve 78, and a rear steering control valve 80. A supply pressure fluid circuit 82 interconnects the pressure source 70 and the rear steering control valve 80 in fluid communication. A command valve supply fluid circuit 84 interconnects the rear steering control valve 80 with both the right steering command valve 78 and the left steering command valve 76 in fluid communication. A left side steering fluid circuit 86 interconnects the left side actuator 56 and the left steering command valve 76 in fluid communication. A right side steering fluid circuit 88 interconnects the right side actuator 58 and the right steering command valve 78 in fluid communication. A fluidic tie rod fluid circuit 90 interconnects both the left side actuator 56 and the right side actuator 58 with the rear steering control valve 80 in fluid communication. A tank return fluid circuit 92 interconnects the rear steering control valve 80, the left steering command valve 76, the right steering command valve 78, and the tank 72 in fluid communication. A pilot supply fluid circuit 94 is disposed in fluid communication with the left steering command valve 76, the right steering command valve 78, and the rear steering control valve 80. A pilot return fluid circuit 134 is disposed in fluid communication with the left steering command valve 76, the right steering command valve 78, the rear steering control valve 80, and the tank 72. A cross-valve fluid circuit 136 interconnects the left steering command valve 76 and the right steering command valve 78 in fluid communication. A pressure sensor fluid circuit 96 is disposed in fluid communication with the right steering command valve 78.

The rear steering control valve 80 is controllable between a first state and a second state. When the rear steering control valve 80 is disposed in the first state, the fluidic tie rod fluid circuit 90 and the tank return fluid circuit 92 are connected in fluid communication and the supply pressure fluid circuit 82 and the command valve supply fluid circuit 84 are disconnected from fluid communication. When the rear steering control valve 80 is disposed in the second state the fluidic tie rod fluid circuit 90 and the tank return fluid circuit 92 are disconnected from fluid communication and the supply pressure fluid circuit 82 and the command valve supply fluid circuit 84 are connected in fluid communication. The rear steering control valve 80 is normally disposed in the first state and is controlled into the second state in response to an activation signal. The activation signal causes the rear steering control valve 80 to move from the first state to the second state. In the absence of the activation signal, the rear steering control valve 80 returns to or maintains its position in the first state.

The activation signal for the rear steering control valve 80 may include an input that is capable of moving the rear steering control valve 80 from the first state into the second state. For example, the activation signal for the rear steering control valve 80 may include, but is not limited to, a fluid signal, a pneumatic signal, an electronic signal, a mechanical signal, etc. In the example embodiment shown in FIG. 2, the rear steering control valve 80 is a pilot actuated position control valve, in which a dedicated pilot valve 98 is disposed in fluid communication with the pilot supply fluid circuit 94 and is operable in response to an electronic signal to provide a hydraulic activation signal to the rear steering control valve 80 to move the rear steering control valve 80 from its first position to its second position. It should be appreciated that the rear steering control valve 80 and the manner of actuating the rear steering control valve 80 may differ from the example embodiment depicted in FIG. 2 and described herein.

As shown in the example embodiment of FIG. 2, the left steering command valve 76 may include a pilot actuated variable directional control valve. The left steering command valve 76 is moveable between a first state, a second state, and a plurality of positions between the first state and the second state. When the left steering command valve 76 is disposed in the first state, the left steering command valve 76 is configured to disconnect fluid communication between the left side steering fluid circuit 86 and the tank return fluid circuit 92, connect fluid communication between the pilot return fluid circuit 134 and the cross-valve fluid circuit 136, and disconnect fluid communication between the command valve supply fluid circuit 84 and the right side steering fluid circuit 88. When the left steering command valve 76 is disposed in the second state, the left steering command valve 76 is configured to connect fluid communication between the left side steering fluid circuit 86 and the tank return fluid circuit 92, close fluid communication to the pilot return fluid circuit 134, and connect fluid communication between the command valve supply fluid circuit 84 with both the right side steering fluid circuit 88 and the cross-valve fluid circuit 136. The left steering command valve 76 is normally disposed in the first state and is controlled into the second state or a position between the first state and the second state in response to a variable activation signal. The variable activation signal causes the left steering command valve 76 to move from the first state into the second state or to a desired position between the first state and the second state. In the absence of the activation signal, the left steering command valve 76 returns to and/or maintains its position in the first state.

The variable activation signal for the left steering command valve 76 may include an input that is capable of moving the left steering command valve 76 from the first state into the second state or to a position between the first state and the second state. For example, the variable activation signal for the left steering command valve 76 may include, but is not limited to, a variable fluid signal, a variable pneumatic signal, a variable electronic signal, a variable mechanical signal, etc. In the example embodiment shown in FIG. 2, the left steering command valve 76 is a variable pilot actuated variable position control valve, in which a dedicated variable pilot valve 100 is disposed in fluid communication with the pilot supply fluid circuit 94 and is operable in response to an electronic signal to provide a variable hydraulic activation signal to the left steering command valve 76 to move the left steering command valve 76 from its first position to its second position or a position between its first position and its second position. It should be appreciated that the left steering command valve 76 and the manner of actuating the left steering command valve 76 may differ from the example embodiment depicted in FIG. 2 and described herein.

As shown in the example embodiment of FIG. 2, the right steering command valve 78 may include a pilot actuated variable directional control valve. The right steering command valve 78 is moveable between a first state, a second state, and a plurality of positions between the first state and the second state. When the right steering command valve 78 is disposed in the first state, the right steering command valve 78 is configured to disconnect fluid communication between the right side steering fluid circuit 88 and the tank return fluid circuit 92, connect fluid communication between the cross-valve fluid circuit 136 and the pressure sensor fluid circuit 96, and disconnect fluid communication between the command valve supply fluid circuit 84 and the left side steering fluid circuit 86. When the right steering command valve 78 is disposed in the second state, the right steering command valve 78 is configured to connect fluid communication between the right side steering fluid circuit 88 and the tank return fluid circuit 92, disconnect fluid communication to the cross-valve fluid circuit 136, and connect fluid communication between the command valve supply fluid circuit 84 and both the left side steering fluid circuit 86 and the pressure sensor fluid circuit 96. The right steering command valve 78 is normally disposed in the first state and is controlled into the second state or a position between the first state and the second state in response to a variable activation signal. The variable activation signal causes the right steering command valve 78 to move from the first state into the second state or to a desired position between the first state and the second state. In the absence of the activation signal, the right steering command valve 78 returns to and/or maintains its position in the first state.

The variable activation signal for the right steering command valve 78 may include an input that is capable of moving the right steering command valve 78 from the first state into the second state or to a position between the first state and the second state. For example, the variable activation signal for the right steering command valve 78 may include, but is not limited to, a variable fluid signal, a variable pneumatic signal, a variable electronic signal, a variable mechanical signal, etc. In the example embodiment shown in FIG. 2, the right steering command valve 78 is a variable pilot actuated variable position control valve, in which a dedicated variable pilot valve 102 is disposed in fluid communication with the pilot supply fluid circuit 94 and is operable in response to an electronic signal to provide a variable hydraulic activation signal to the right steering command valve 78 to move the right steering command valve 78 from its first position to its second position or a position between its first position and its second position. It should be appreciated that the right steering command valve 78 and the manner of actuating the right steering command valve 78 may differ from the example embodiment depicted in FIG. 2 and described herein.

The hydraulic system 68 further includes a cross port pressure relief system 104 that interconnects the left side steering fluid circuit 86, the right side steering fluid circuit 88, and the fluidic tie rod fluid circuit 90 in fluid communication. As shown in the example embodiment of FIG. 2, the cross port pressure relief system 104 includes a left side pressure relief valve 106 and a right side pressure relief valve 108. The left side pressure relief valve 106 includes a first port 110 connected in fluid communication to the left side steering fluid circuit 86, and a second port 112 connected in fluid communication to the fluidic tie rod fluid circuit 90. The right side pressure relief valve 108 includes a first port 114 connected in fluid communication to the right side steering fluid circuit 88, and a second port 116 connected in fluid communication to the fluidic tie rod fluid circuit 90. The second port 112 of the left side pressure relief valve 106 and the second port 116 of the right side pressure relief valve 108 are both connected in fluid communication to each other, and to the fluidic tie rod fluid circuit 90. In the example shown in FIG. 2, the left side pressure relief valve 106 and the right side pressure relief valve 108 are disposed in the valve block 74. However, in other embodiments, the left side pressure relief valve 106 and the right side pressure relief valve 108 may be disposed in another or different valve body.

The left side pressure relief valve 106 and the right side pressure relief valve 108 provide two-way pressure relief. In other words, regardless of which direction the fluid pressure is applied from, i.e., from the first ports 110, 114 to the second ports 112, 116 respectively or from the second ports 112, 116 to the first ports 110, 114 respectively, the left side pressure relief valve 106 and the right side pressure relief valve 108 are configured to allow fluid communication when the applied fluid pressure is greater than a defined limit.

The left side steering fluid circuit 86 is disposed in fluid communication with the inboard port 64 of the left side actuator 56. A left side line 132 is disposed in fluid communication with the outboard fluid port 66 of the left side actuator 56. The right side steering fluid circuit 88 is disposed in fluid communication with the inboard port 60 of the right side actuator 58. A right side line 130 is disposed in fluid communication with the outboard fluid port 62 of the right side actuator 58. The right side line 130 and the left side line 132 are connected to each other and to the fluidic tie rod fluid circuit 90 in fluid communication.

The flow of hydraulic fluid to each of the left side actuator 56 and the right side actuator 58 can be varied proportionally which will change the rate at which the agricultural machine 20 steers. For instance, if the operator desires to make a minor steering correction, either the left or right steering command valve 76, 78 may be controlled partially open. If, however, the operator needs to make a quick, aggressive steering motion, either steering command valve may be opened more fully to increase the flow of hydraulic fluid to either the left side actuator 56 or the right side actuator 58. Each actuator may be controlled independent of the other.

Although the rear steering system has been described above as being a hydraulic system, it is also possible that the rear steering system may be controlled electrically. For instance, the left side actuator 56 and the right side actuator 58 may be electric actuators which are variably controlled by a controller. Moreover, the rear steering system may include actuators that communicate with each other via means of an electrical, mechanical, or hydraulic control signal.

The rear steering system may be active or passive. When passive, there may be no input into the system dynamics. The rear actuators, for example, may provide damping to the rear caster wheels.

Figure 3:
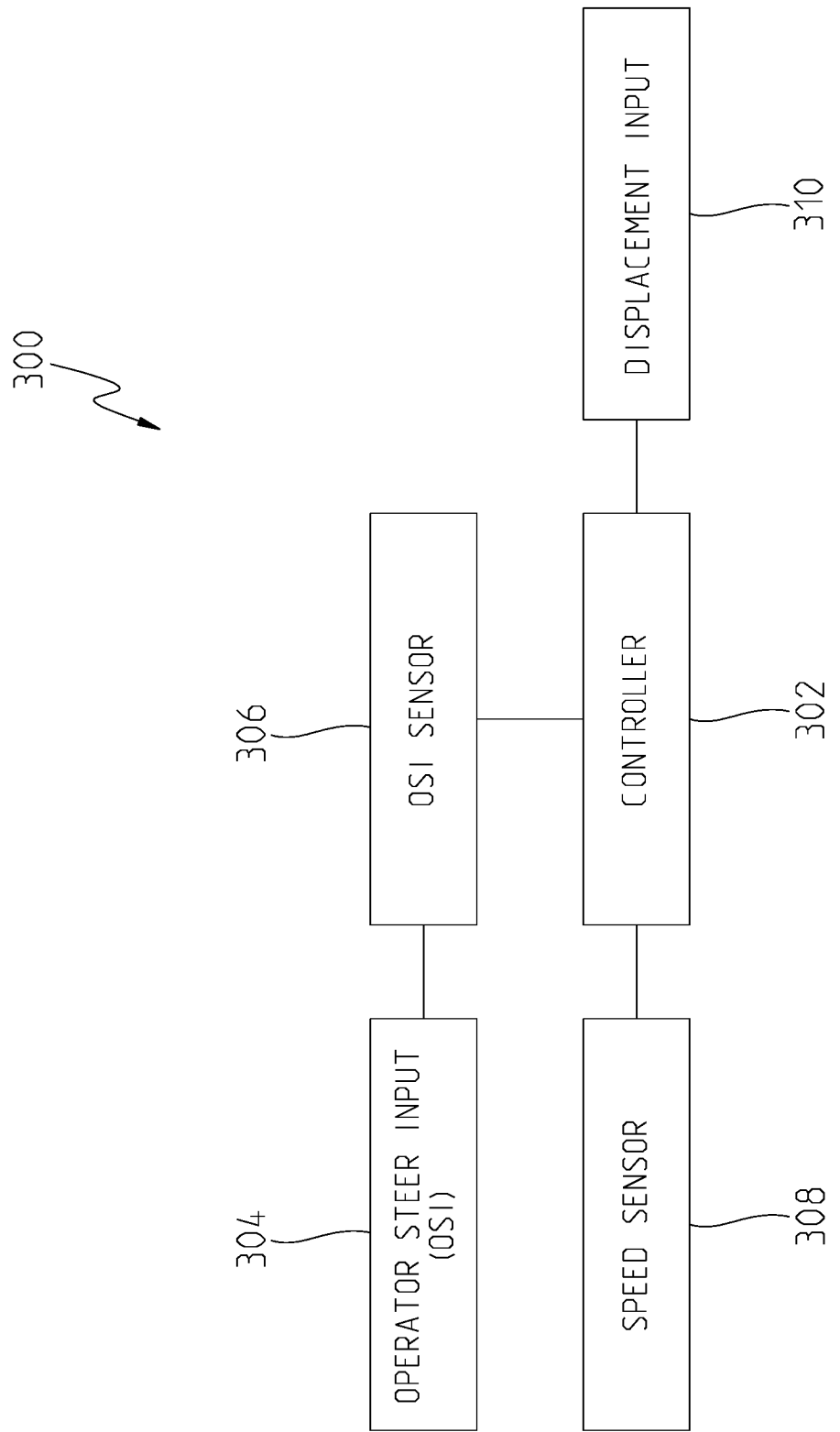
FIG. 3 is a schematic layout of a control system of the agricultural machine.

Referring to FIG. 3, one embodiment of a control system 300 of the agricultural machine 20 of FIG. 1 is shown. The control system 300 may include a controller 302 as previously described. The controller 302 may comprise more than one controller. For example, the controller 302 may include a vehicle controller, an engine or prime mover controller, a transmission controller, a motor controller, a pump controller, a front or primary steering system controller, a rear or secondary steering system controller, an electronic displacement controller, and the like. Thus, the controller 302 may include one or more controllers for controlling the operation of the machine 20.

An operator of the machine 20 may operably control an operator steer input (OSI) 304 such as a steering wheel, joystick, etc. As the operator controls the OSI 304, an OSI sensor 306 may detect movement of the OSI. For instance, an operator may turn a steering wheel in a right, clockwise direction. The OSI sensor 306 may be coupled to a steering column of the steering wheel, detect the movement of the steering wheel 304, and communicate the movement and how fast the steering wheel is being turned to the controller 302.

The operator steer input 304 may be located in an operator's cab of the machine 20. The operator steer input 304 may be one of a plurality of operator controls for controlling operation of the machine 20. In addition, an operator displacement input 310 may also be located in the cab and disposed in communication with the controller 302. The displacement input 310 may be displayed on a display screen or other location for the operator to access. The displacement input 310 allows an operator to adjust a displacement value of the first motor 40 and the second motor 42.

As also shown in FIG. 3, a speed sensor 308 may be in electronic communication with the controller 302. The speed sensor 308 may provide an input of machine speed to the controller 302. This will be described in further detail below.

During a steering maneuver the controller 302 may send a command current that can be varied to one of the command valves to provide the respective hydraulic actuator with fluid at a given flow rate. A second mechanical mechanism or control signal may also provide input into the front or primary steering system when the operator gives a steering input via the OSI 304. A machine, such as the agricultural machine 20 of FIG. 1, that uses hydraulic motors to propel and/or steer the machine may offer the ability to shift displacements to provide high torque, low speed operation or low torque, high speed operation.

The primary steering system may comprise either fixed displacement motors or variable displacement motors. In the former arrangement, the displacement of the drive motors 40, 42 is fixed. The speed may be varied by changing the swash angle on the drive pumps 36, 38. A charge pump (e.g., pressure source 70) may be used to make up for volumetric losses. In the latter arrangement, displacement of the drive motors 40, 42 may be variable to change between the high torque, low speed operation and the low torque, high speed operation. This variability may be ramped or stepped depending on motor type. Moreover, the swash plate angles of the first and second pumps 36, 38 may be changed to vary the flow rate supplied to the drive motors. This may be accomplished by using the previously-described mechanical method or electronic method that relates steering wheel position to a corresponding swash plate angle.

Figure 4:
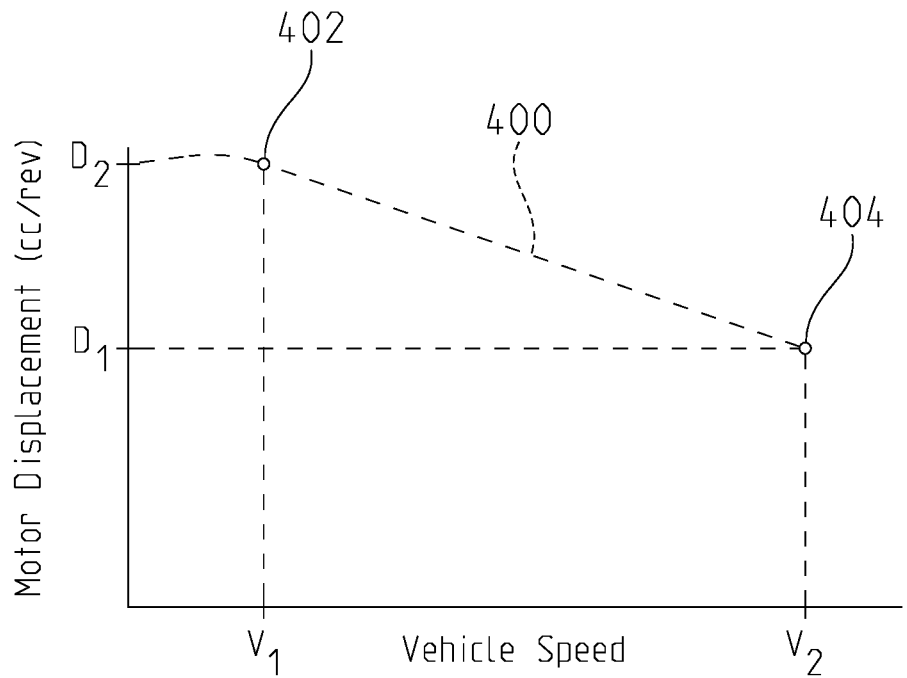
FIG. 4 is a graphical illustration of motor displacement relative to vehicle speed.

In FIG. 4, a graphical illustration is provided illustrating a relationship between motor displacement and vehicle or machine speed. Here, a displacement curve 400 shows a first point 402 at a first speed, V1, and a first motor displacement D1, and a second point 404 at a second speed, V2, and a second motor displacement D2. The linear relationship between motor displacement and vehicle speed illustrates how the two are inversely related to one another. In other words, at the higher vehicle speed V2, the motor displacement D2 is less than at the first displacement D1 which is at a lower vehicle speed V1.

Steering gains are generally dependent on vehicle speed as well. For instance, as vehicle speed increases, gross steering gain generally decreases in order to make the steering response more comfortable to the operator as the vehicle accelerates. As steering gain increases, more hydraulic flow is provided to the steering actuators in the rear steering system to increase steering responsiveness.

Figure 5:
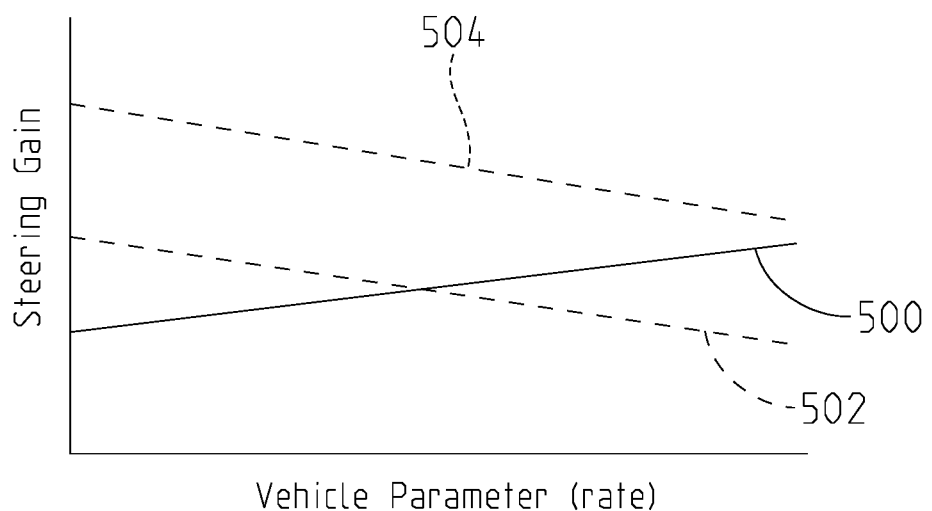
FIG. 5 is a graphical illustration of conventional rear steering variable gain and front hydro differential gain relative to a vehicle parameter.

This relationship is shown in FIG. 5. Here, the front or primary hydrostat differential gain is shown having a linear curve 500 relative to a vehicle parameter such as speed. The front drive motors can provide multiple displacements to allow for high torque, low speed operation in a field setting or mode and low torque, high speed operation in a transport setting or mode. Generally, the motor is set at high displacement to get more torque, and low displacement to get less torque but more speed. When shifting to transport mode, the motor gets smaller which can cause changes to the response in the system. For instance, even though the displacement decreases, the same amount of hydraulic flow is received. So, the wheel or tire speed increases but torque capability decreases at higher speeds, and this can negatively affect steering response.

To address challenges in steering response, the rear steering system is provided to improve steering response. In FIG. 5, a pair of conventional rear steering variable gain curves 502, 504 are shown relative to the vehicle parameter such as speed. The first rear steering variable gain curve 502 may be for field mode where the motor displacement is high resulting in greater torque at the front wheels. In field mode, the front or primary differential steering system is able to control the steering without requiring much assistance from the rear steering system. Thus, less gain is needed on the rear steering system.

The second rear steering variable gain curve 504 may be for transport mode where the motor displacement is lower resulting in less torque at the front wheels. Here, more assistance from the rear steering system is needed to help with steering response. However, in FIG. 5, each of the rear steering variable gain curves decrease with an increase in vehicle parameter (e.g., vehicle speed). The issue in this conventional arrangement is that torque transmitted to the ground during a steering operation is changed when the displacement of the motor is changed from field mode (i.e., high displacement, high torque, low speed) to transport mode (i.e., low displacement, low torque, high speed) thus resulting in different steering performance. As shown in FIG. 5, the authority of the conventional rear steer system is inversely proportional to the vehicle parameter (i.e., speed) for both displacement modes which can result in unsatisfactory performance when the rear steer system and front drive motors are used to steer the machine together.

To overcome these disadvantages, the present disclosure provides various embodiments for improving vehicle steering and handling characteristics by implementing a steering control logic that is differentiated between the front differential motor displacements to change the handling characteristics between field and transport operating modes. This proposed solution provides different steering gain rates for a given vehicle parameter and motor displacement. The control logic can provide the ability to better match the rear steering gains with the primary differential steering system to offer consistent steering performance over a range of operating conditions. In particular, when operating in transport mode, the control logic can increase the command for more rear steering variable gain to make up for the lack of torque at the front wheels in order to improve the machine's responsiveness.

Figure 6:
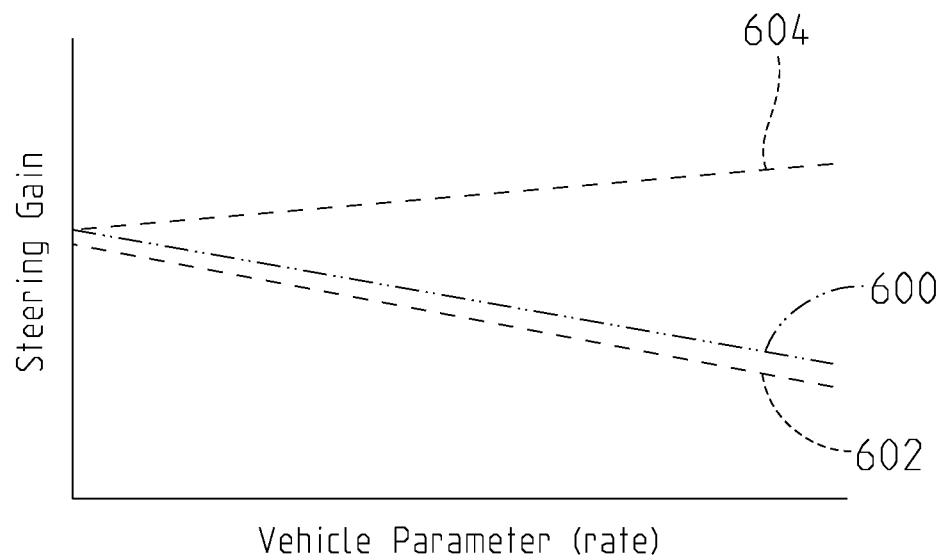
FIG. 6 is a graphical illustration of a rear steering variable gain as a function of motor displacement relative to a vehicle parameter.

Referring to FIG. 6, the rear steering gain is shown relative to a vehicle parameter such as vehicle speed. Here, a conventional rear steering curve 600 is shown representative of a conventional control system in which the rear steering gain profile is inversely proportional to a given vehicle parameter. This curve 600 is similar to the rear steering gain curves 502, 504 shown in FIG. 5. To improve upon this conventional control system, one embodiment of the present disclosure provides a control system which is capable of offering different steering gain rates or curves for a given vehicle parameter and motor displacement. For instance, a first rear steering gain profile 602 may be provided for a first motor displacement in which the front differential steering system has the maximum torque available for a steering maneuver which requires less input from the rear steering system to perform a steering operation. In other words, the first motor displacement corresponds with a field mode. A second rear steering gain profile 604 may be provided for a second motor displacement for transport mode. In the second motor displacement, the displacement of the motor is decreased to provide the ability to travel faster. This results in a decrease in the transfer of differential torque when making a steering maneuver thus requiring more rear steering input to perform an optimal steering maneuver. To improve the steering response, a different rear steering gain may be applied to make up for the loss of torque capacity. In this embodiment, the rear steering gain may be increased proportionally relative to vehicle speed to increase flow to the rear actuators.

Thus, during machine operation, the operator is able to select the type of motor displacement desired based on the type of machine operation. To do so, the operator may actuate the displacement input 310. For example, if the machine is operating in field mode, the drive motors of the primary or front steering system may be functioning at a first displacement level. At the first displacement level, the torque capacity is at its greatest and machine speed is generally low. Here, the control system 300 may operate based on logic according to the first rear steering gain profile 602. In one example, a machine may travel between 0-16 mph in the field mode at the first displacement level.

When the operator, however, triggers the displacement input 310 to switch from the first displacement level to a second displacement level associated with transport mode, the motor displacement switches from high torque, low speed to low torque, high speed. The control system 300 may switch to a control logic corresponding with the second rear steering gain profile 604. The second rear steering gain profile 604 provides for an increasing amount of gain as the vehicle parameter increases. This helps stabilize steering response as the torque capacity of the primary steering system decreases with an increase in vehicle parameter.

Figure 7:
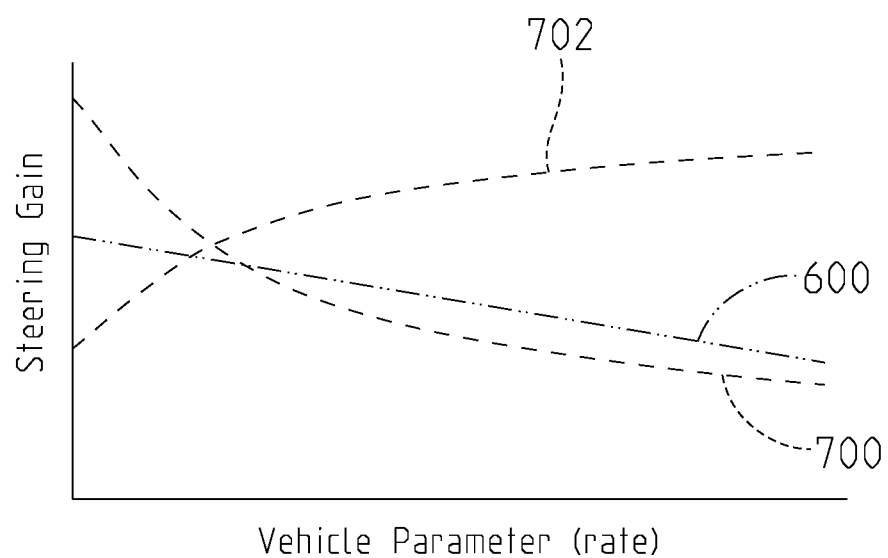
FIG. 7 is another graphical illustration of a rear steering variable gain as a function of motor displacement relative to a vehicle parameter.

Referring to FIG. 7, another embodiment of the present disclosure is provided for a non-linear rear steering gains over a given range of a vehicle parameter such as speed. In this embodiment, the same conventional rear steering gain profile 600 is shown along with a first rear steering gain profile 700 and a second rear steering gain profile 702. The first and second rear steering gain profiles are non-linear in this embodiment, which is different from the embodiment in FIG. 6. The first rear steering gain profile 700 corresponds with a first motor displacement associated with field mode and the second rear steering gain profile 702 corresponds with a second motor displacement associated with transport mode. In view of both profiles, optimized steering gain matching may be optimized between the front differential and rear steering systems. This provides a more comfortable steering experience as the vehicle speed changes during operation. Again, in transport mode, the rear steering system is given greater authority or control over steering response, but the non-linear curvature of the profile 702 is tailored to provide optimal control over the entire range of the given vehicle parameter.

Figure 8:
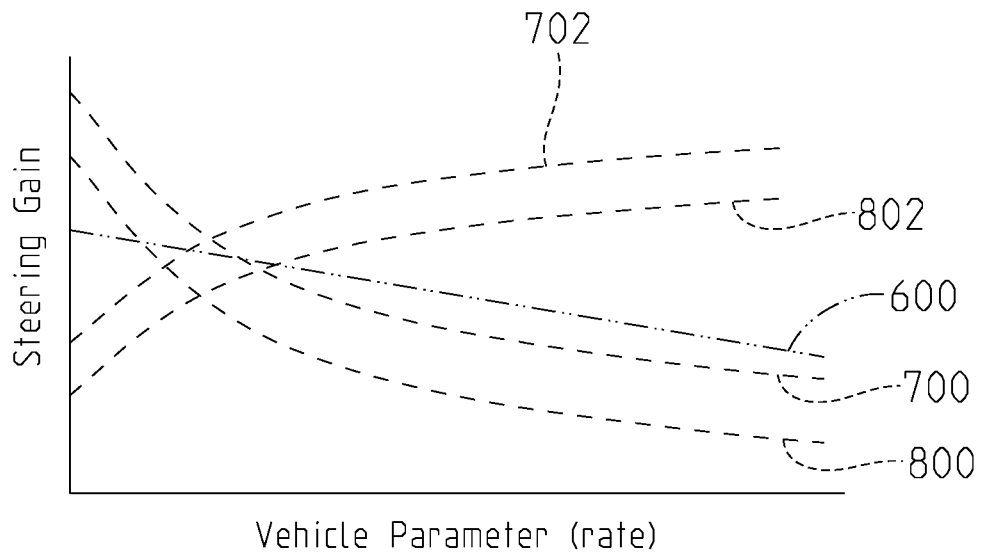
FIG. 8 is a graphical illustration of a rear steering variable gain and front differential steering gain as a function of motor displacement relative to a vehicle parameter.

In view of FIG. 8, a further embodiment of the present disclosure is shown in which the same non-linear gain profiles of FIG. 7 of the rear steering system is combined with non-linear control of the front differential to provide the ability to match the steering gain rates for a given vehicle parameter to prevent the two steering systems from getting out of phase with each other. In this embodiment, the front drive motors may be controlled electro-hydraulically. In doing so, the amount of flow sent to the drive motors may be adjusted to achieve the results of FIG. 8.

In particular, the front drive motors may be adjusted between a first displacement level for field mode and a second displacement level for transport mode. In the first displacement level, the rear steering gain may be operably controlled by the controller 302 based on the first rear steering gain profile 700. Further, the controller 302 may also operably control the front differential steering gain according to a first differential steering profile 800. As shown, the first rear steering gain profile 700 and the first front differential steering profile 800 are non-linear and follow a similar curvature but for the first rear steering gain profile 700 being offset from the first front differential steering profile 800.

In the second displacement level, the rear steering gain is operably controlled by the controller 302 according to the second rear steering gain profile 702. As shown, the second rear steering gain profile 702 is non-linear and increases as the vehicle parameter increases. Similarly, the controller 302 may operably control the front differential steering gain according to a second differential steering profile 802. Again, the front differential steering gain increases at approximately the same rate as the rear steering gain, but the rear steering gain is greater than the front differential steering gain at any given vehicle parameter.

Figure 9:
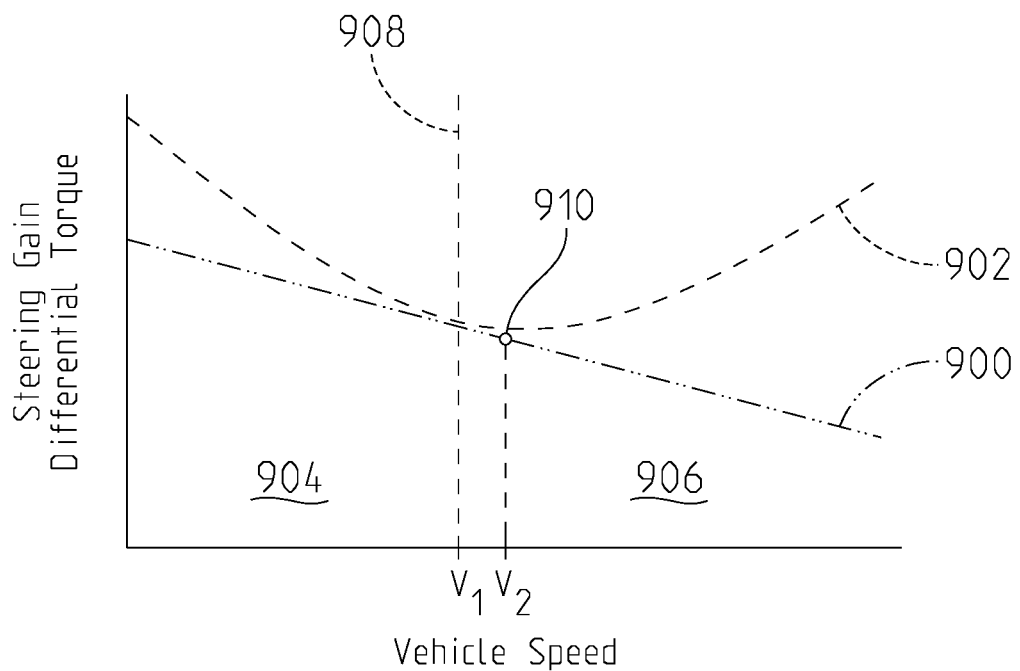
FIG. 9 is a graphical illustration of rear steering variable gain relative to vehicle speed over different operating modes.

Turning now to FIG. 9, an alternative embodiment of the present disclosure is shown. In this embodiment, the range of vehicle speed (or vehicle parameter) is separated into two distinct areas: a field mode 904 and a transport mode 906. In one example, a machine may travel in field mode between 0-16 mph whereas in transport mode the same machine may travel between 0-24 mph. Thus, there can be some overlap between modes of a range of speeds. Nevertheless, in FIG. 9, an implementation is provided for a rear steering system combined with a differential steering system that allows for the displacement or torque characteristics to change over a speed range such as a variable displacement or electric motor.

In this embodiment, a first differential motor torque profile 900 is provided in which differential torque linearly decreases as vehicle speed increases due to the ability to change motor displacement or electric motor characteristics. On the other hand, a rear steering gain profile 902 is shown in which the gain decreases in field mode as vehicle speed increases, but then it increases in transport mode as vehicle speed increases. In other words, in field mode, the rear steering gain is inversely related to vehicle speed over the given operating range. At a first vehicle speed V1, a transition line 908 marks a transition separating field mode and transport mode. At a second vehicle speed V2, there is a point 910 at which the second rear steering gain profile 902 begins to increase. This point 910 is shown offset from the transition line 908. Stated differently, the change between gain decreasing and increasing occurs at the point 910 after the machine reaches a maximum field operating speed.

In aspect of this embodiment, if an electric or hydraulic motor is employed, a point may be set at which the controller 302 changes from one rear steering gain profile to another. A first profile may occur in area 904 and the change is made once the vehicle speed reaches V1 or V2, for example.

In another aspect of this embodiment, electric motors may be used on both the front and rear wheels to operably drive the front and rear steering systems.

Figure 10A:
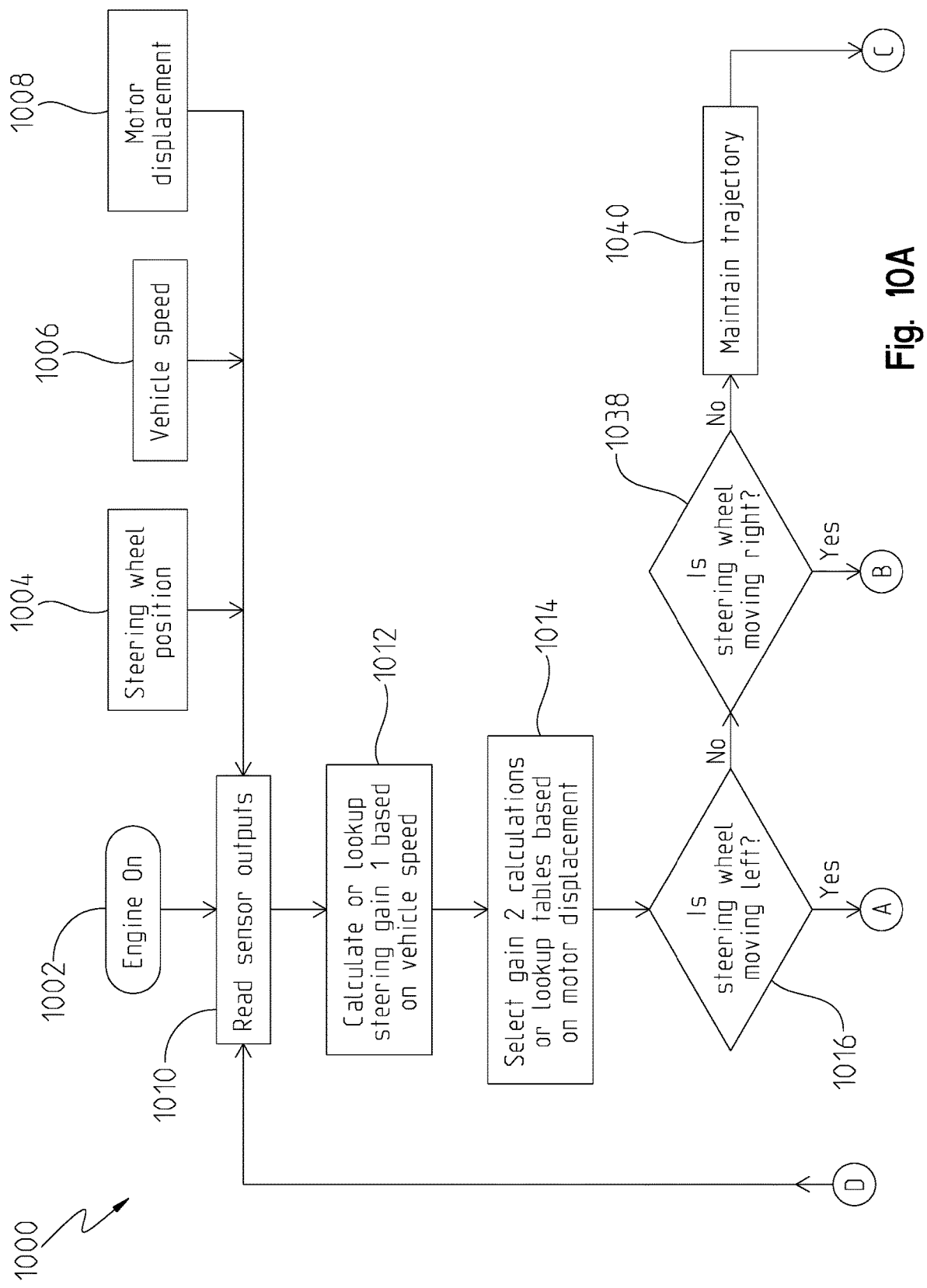
FIGS. 10A-C is a flow diagram of a method of controlling a front and rear steering system of the agricultural machine of FIG. 1.
Figure 10B:
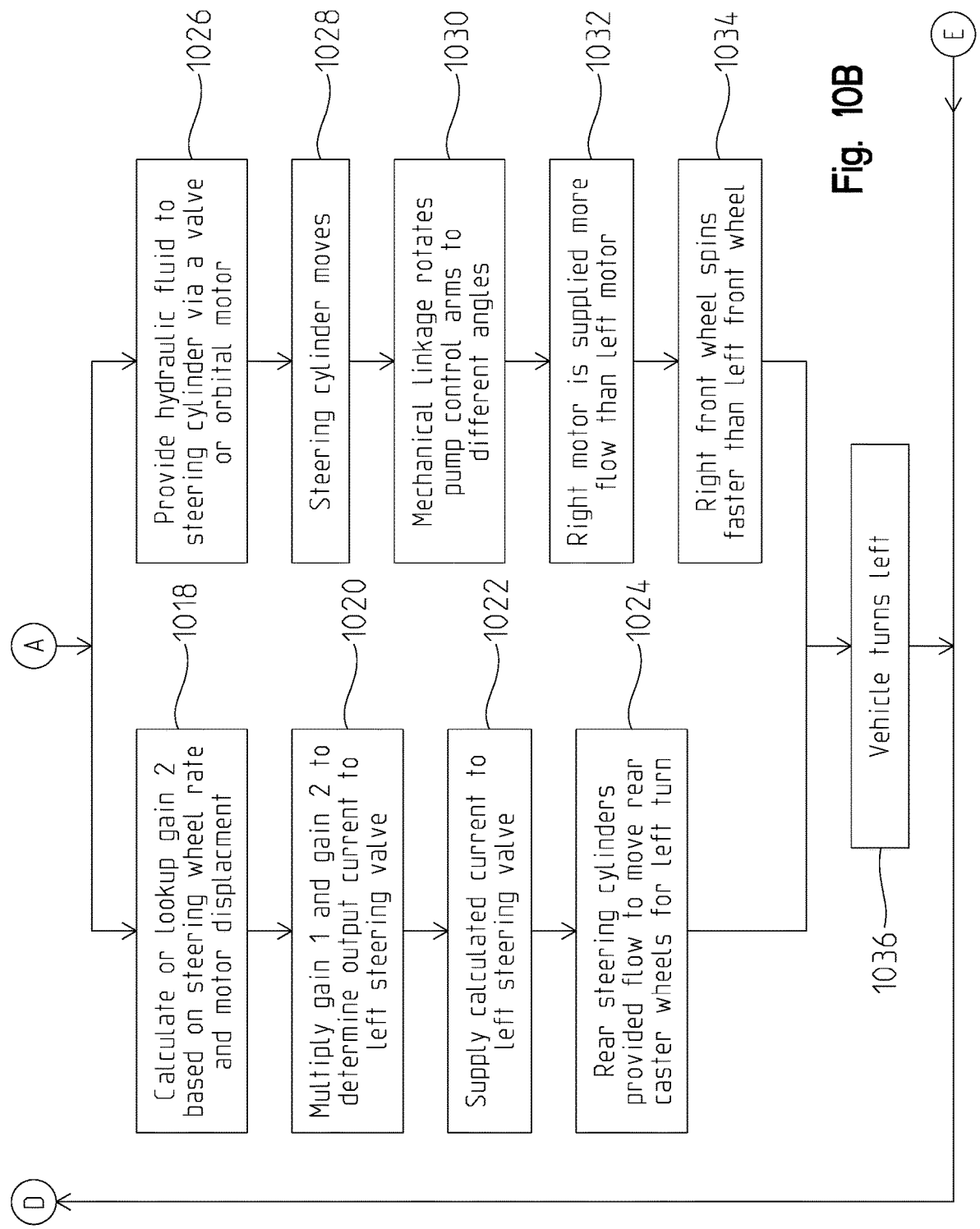
Figure 10C:
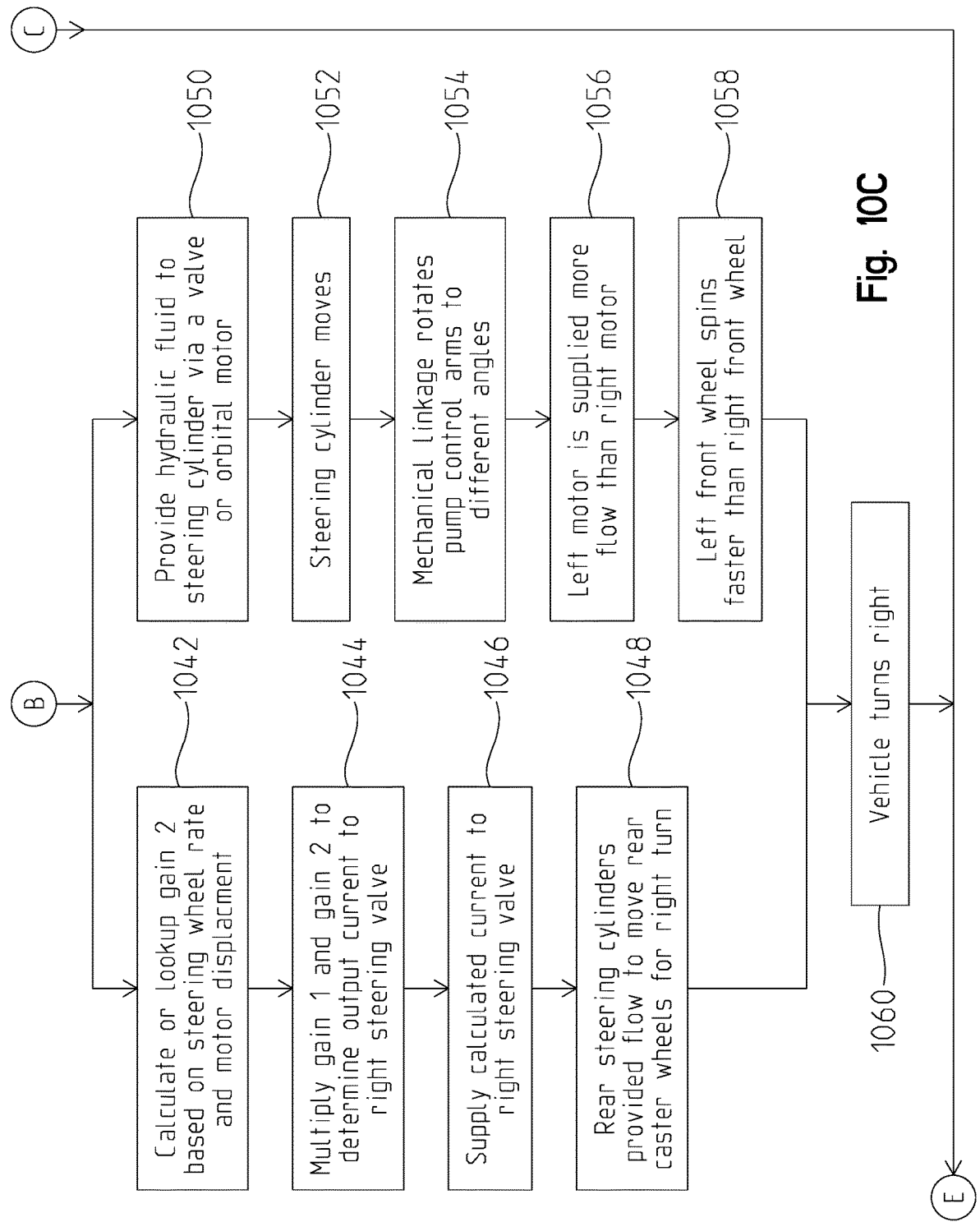

The present disclosure also discloses one or more embodiments of methods for controlling vehicle maneuverability via steering system control. In FIGS. 10A-C, for example, one embodiment of a control method 1000 for controlling the steering of an agricultural machine is shown. Here, the method 1000 may include a plurality of blocks or steps which are executed to cause the machine to travel in a desired travel direction. The illustrated blocks or steps are not intended to be limiting, nor are they intended to illustrate a specific order in which each must be executed relative to the other blocks or steps. Further, in other embodiments of the method 1000, other blocks or steps may be executed to achieve the desired control. Moreover, in other embodiments of the method 1000, one or more of the illustrated blocks or steps may not be executed to achieve desired control Thus, the method 1000 of FIGS. 10A-C is not intended to be limiting but only illustrative of one example in which an agricultural machine may be controlled.

For sake of describing the control method 1000, the agricultural machine 20 of FIG. 1 includes the hydraulic system 68 of FIG. 2 and the control system 300 of FIG. 3. The controller 302 may include a memory unit (not shown)

for storing software, algorithms, control logic, look-up tables, graphs, calculations, and the like in order to execute the control method 1000. In one example, the memory unit of the controller 302 may store the different profiles of one or more of FIGS. 6-9. All or only a portion of the control method 1000 may be stored in the memory unit as control logic which is executable by a processor (not shown) of the controller 302.

In a first block 1002 of the control method 1000, the controller 302 may determine if the engine or prime mover 24 is on. This may be via an ignition sensor or switch that communicates directly or indirectly with the controller 302. Other ways are also possible for determining if the engine or prime mover is on, and this block 1002 is not intended to be limiting to any specific manner.

A steering wheel position may be detected by an operator steer input sensor 306 in block 1004 and a machine or vehicle speed may be detected by a speed sensor 308 in block 1006. The operator of the machine may also select a motor displacement level or type in block 1008 via the motor displacement input 310, and this too may be detected or communicated to the controller. Further, the controller 302 may read sensor outputs from the operator steer input sensor 306, the speed sensor 308, and the displacement input 310 in block 1010 of the method 1000. From the outputs, the controller 302 may next calculate or lookup a first steering gain value in block 1012. In one example, the first steering gain value may be based solely off machine speed. In another example, the first steering gain may be based off a combination of machine speed and steering wheel position. In a further example, the first steering gain may be based off a combination of machine speed and motor displacement.

If the first steering gain value is determined in block 1012 as a function of machine or vehicle speed only, the method 1000 may then advance to block 1014 where the controller 302 determines a second gain value as a function of motor displacement. This determination may come from calculations or a lookup table. The steering gain may be determined based on whether the operator selected a first displacement for field mode or a second displacement for transport mode. This steering gain may correspond with any of the steering gain profiles of FIG. 6-9.

Once the steering gain is determined as a function of vehicle speed and motor displacement, the method 1000 may advance to block 1016 where the controller 302 determines if the steering wheel (i.e., operator steer input) is moving. For example, the controller 302 may determine if the steering wheel is moving leftward or counterclockwise in block 1016. If not, the controller 302 may determine if the steering wheel is moving in a second direction, e.g., rightward or clockwise, in block 1038. If the controller 302 determines that the steering wheel is not moving in either the first or second direction in blocks 1016 and 1038, the method 1000 may advance to block 1040 and maintain the agricultural machine 20 in its current trajectory.

In the event the controller 302 determines the operator is turning the steering wheel in the first direction in block 1016, the method may advance to block 1018 where the controller 302 may calculate or lookup a different steering gain based on steering wheel rate and motor displacement. Here, the controller 302 may include rear steering gain curves similar to those shown in FIGS. 6-9 where the controller 302 determines the gain therefrom, but the vehicle parameter in this instance is steering wheel rate (instead of vehicle speed). Additional or different profiles may be stored in the memory unit of the controller 302 to determine this gain.

In any event, once the steering gain is determined in block 1018 based on steering wheel rate, the method 1000 may advance to block 1020 where the controller 302 multiplies the two steering gain values to determine an output current to the left steering command valve 76. Once the output current is determined, the controller 302 may send the calculated current to the valve 76 in block 1022 such that the left steering command valve 76 opens an amount corresponding to the output current to provide hydraulic fluid to actuate the left side actuator 56 and move the left rear caster wheel 44 in block 1024.

As the rear steering system is controlled according to blocks 1018 through 1024, the controller 302 is also able to control the front or primary differential steering system independently from the rear steering system. Moreover, the front or primary differential steering system may be controlled simultaneously or at a different time than the rear steering system. In FIGS. 10A-C, the front or primary differential steering system may include the mechanical mechanism as described above. As such, hydraulic fluid may be provided to the steering actuator via a valve or orbital motor in block 1026. As this happens, the steering actuator moves in block 1028 to induce rotational movement of the mechanical mechanism or linkage. This causes pump control arms to rotate to different angles to vary displacement in block 1030. To control the agricultural machine in the left or first direction, the right or second hydraulic motor 42 may receive more fluid flow than the left or first hydraulic motor 40 in block 1032. As this happens, the right front wheel 28 may spin or rotate faster than the left front wheel 26 in block 1034. Thus, the front or primary differential steering system may be controlled in blocks 1026-1034. In combination with the control of the front and rear steering systems, the agricultural machine 20 is able to turn in the left direction in block 1036.

In the event the controller 302 determines in block 1038 that the operator wants to turn the vehicle to the right, the method 1000 may advance to block 1042 which is similar to block 1018. Here, the controller 302 may calculate or lookup a second steering gain value based on steering wheel rate. Here, the controller 302 may include one or more rear steering variable gain profiles similar to those shown in FIGS. 6-9 where the controller 302 determines the gain therefrom. Once the second gain is determined in block 1042, the method 1000 may advance to block 1044 where the controller 302 multiplies the two steering gains to determine an output current to the right steering command valve 78. Once the output current is determined, the controller 302 may send the calculated current to the valve 78 in block 1046 such that the right steering command valve 78 opens an amount corresponding to the output current to provide hydraulic fluid to actuate the right side actuator 58 and move the right rear caster wheel 46 in block 1048.

As the rear steering system is controlled according to blocks 1042 through 1048, the controller 302 is also able to control the front or primary steering system independently from the rear steering system. Here, hydraulic fluid may be provided to the steering actuator via a valve or orbital motor in block 1050. As this happens, the steering actuator moves in block 1052 to induce rotational movement of the mechanical mechanism or linkage. This causes pump control arms to rotate to different angles to vary displacement in block 1054. To control the agricultural machine in the right or second direction, the left or first hydraulic motor 40 may receive more fluid flow than the right or second hydraulic motor 42 in block 1056. As this happens, the left front wheel 26 may spin or rotate faster than the right front wheel 28 in block 1058. Thus, the front or primary differential steering system may be controlled in blocks 1050-1058. In combination with the control of the front and rear steering systems, the agricultural machine 20 is able to turn in the right direction in block 1060.

Figure 11A:
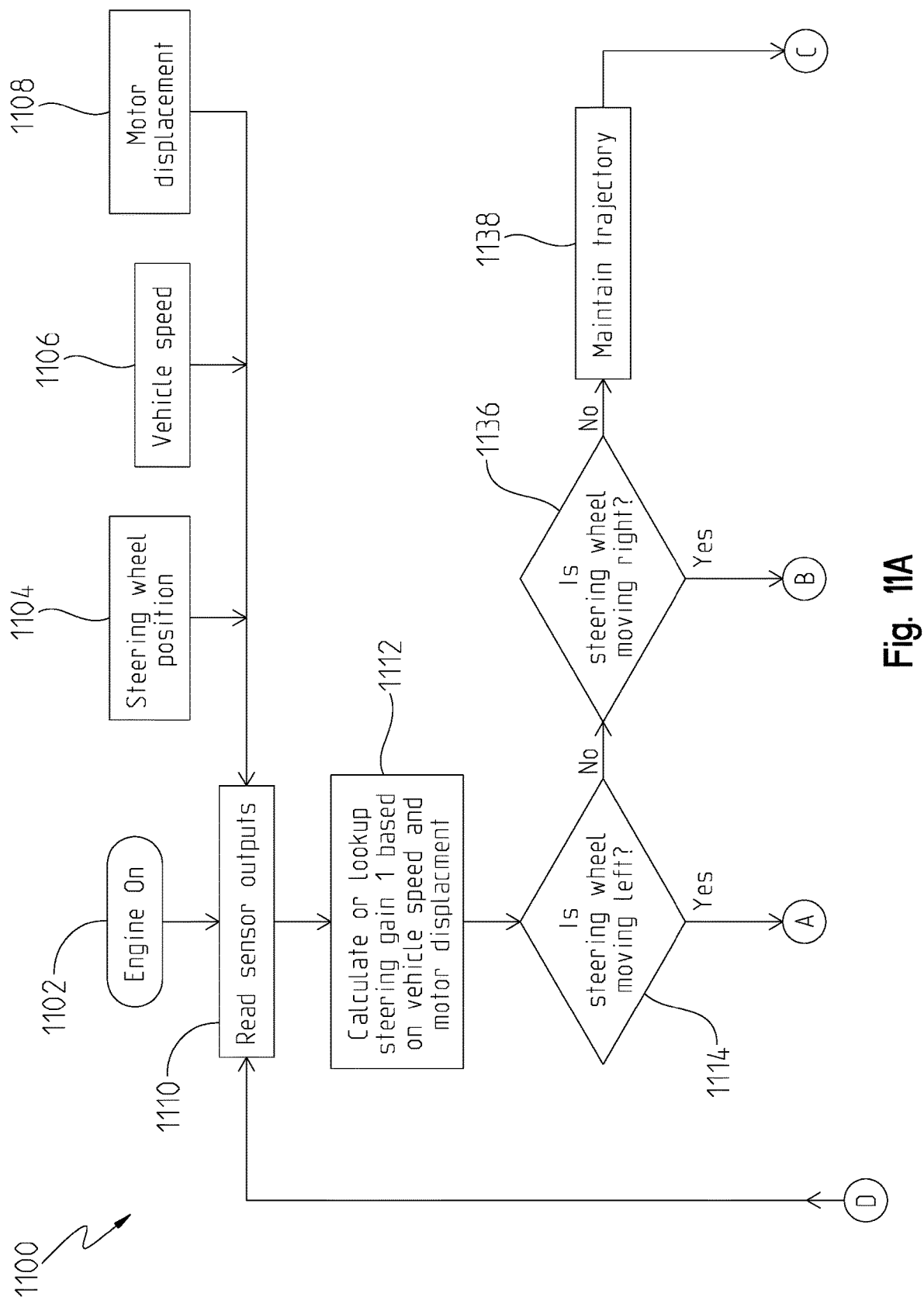
Figure 11C:
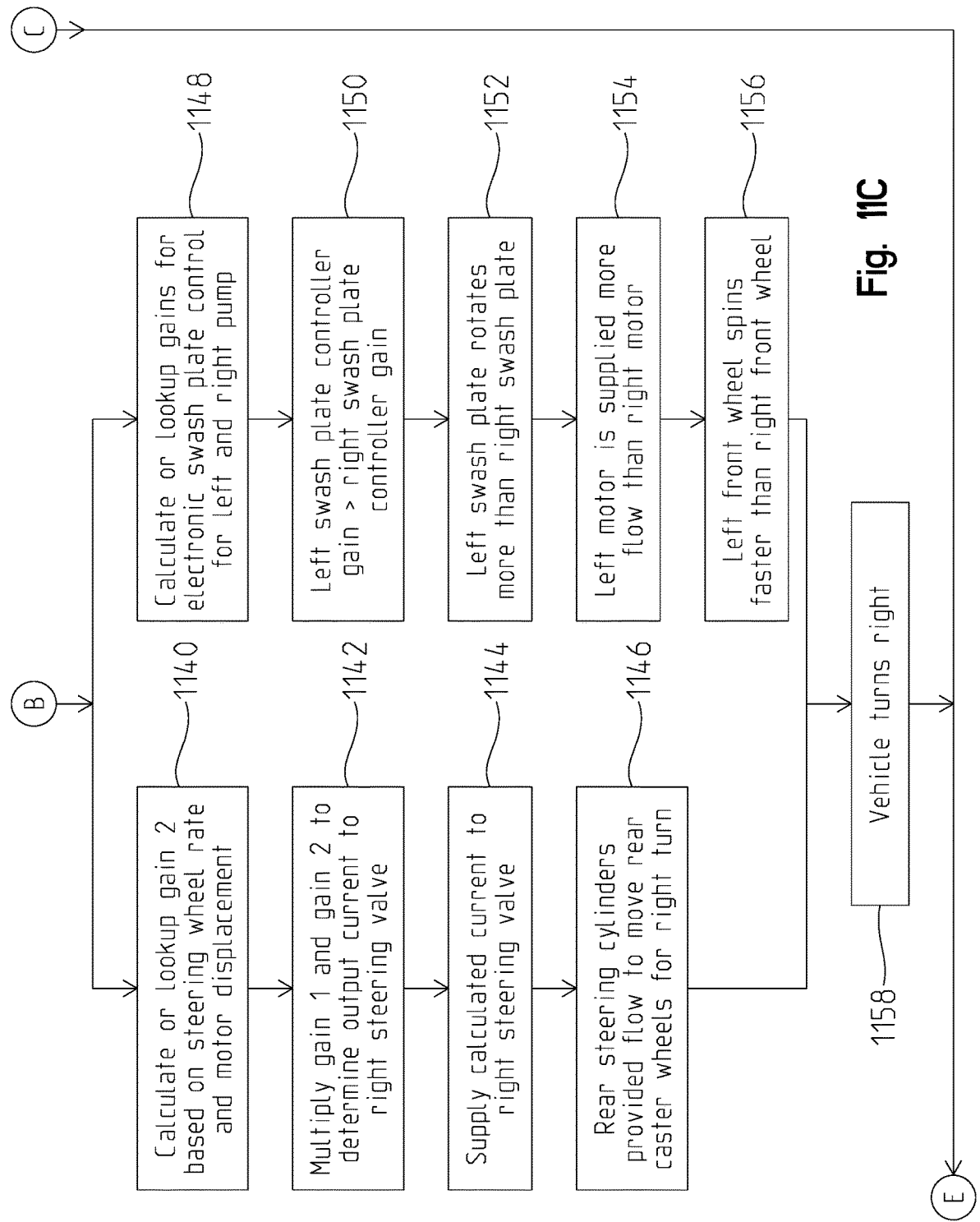

Referring to FIGS. 11A-C, another embodiment of a control method for controlling the steering of an agricultural machine is shown. Here, the method 1100 may include a plurality of blocks or steps which are executed to cause the machine to travel in a desired travel direction. The illustrated blocks or steps are not intended to be limiting, nor are they intended to illustrate a specific order in which each must be executed relative to the other blocks or steps. Further, in other embodiments of the method 1100, other blocks or steps may be executed to achieve the desired control. Moreover, in other embodiments of the method 1100, one or more of the illustrated blocks or steps may not be executed to achieve desired control Thus, the method 1100 of FIGS. 11A-C is not intended to be limiting but only illustrative of one example in which an agricultural machine may be controlled.

For sake of describing the control method 1100, the agricultural machine 20 of FIG. 1 includes the hydraulic system 68 of FIG. 2 and the control system 300 of FIG. 3. However, unlike FIGS. 10A-C, the front differential steering system is described as being electrical rather than mechanical. The controller 302 may include a memory unit (not shown) for storing software, algorithms, control logic, look-up tables, graphs, calculations, and the like in order to execute the control method 1100. In one example, the memory unit of the controller 302 may store the different profiles of one or more of FIGS. 6-9. All or only a portion of the control method 1100 may be stored in the memory unit as control logic which is executable by a processor (not shown) of the controller 302.

In a first block 1102 of the control method 1100, the controller 302 may determine if the engine or prime mover 24 is on. This may be via an ignition sensor or switch that communicates directly or indirectly with the controller 302. Other ways are also possible for determining if the engine or prime mover is on, and this block 1102 is not intended to be limiting to any specific manner.

A steering wheel position may be detected by an operator steer input sensor 306 in block 1104 and a machine or vehicle speed may be detected by a speed sensor 308 in block 1106. The operator of the machine may also select a motor displacement level or type in block 1108 via the motor displacement input 310, and this too may be detected or communicated to the controller. Further, the controller 302 may read sensor outputs from the operator steer input sensor 306, the speed sensor 308, and the displacement input 310 in block 1110 of the method 1100. From the outputs, the controller 302 may next calculate or lookup a first steering gain value in block 1112. In one example, the first steering gain value may be based solely off machine speed. In another example, the first steering gain may be based off a combination of machine speed and motor displacement.

Once the first steering gain value is determined in block 1112, the method 1100 may advance to block 1114 where the controller 302 determines if the steering wheel (i.e., operator steer input) is moving. For example, the controller 302 may determine if the steering wheel is moving leftward or counterclockwise in block 1114. If not, the controller 302 may determine if the steering wheel is moving in a second direction, e.g., rightward or clockwise, in block 1136. If the controller 302 determines that the steering wheel is not moving in either the first or second direction in blocks 1116 and 1136, the method 1100 may advance to block 1138 and maintain the agricultural machine 20 in its current trajectory.

In the event the controller 302 determines the operator is turning the steering wheel in the first direction in block 1116, the method may advance to block 1118 where the controller 302 may calculate or lookup a second gain value based on steering wheel rate and motor displacement. Here, the controller 302 may include rear steering gain curves similar to those shown in FIGS. 6-9 where the controller 302 determines the gain therefrom, but the vehicle parameter in this instance is steering wheel rate (instead of vehicle speed). Additional or different profiles may be stored in the memory unit of the controller 302 to determine this gain.

In any event, once the steering gain is determined in block 1116 based on steering wheel rate, the method 1100 may advance to block 1118 where the controller 302 multiplies the two steering gain values to determine an output current to the left steering command valve 76. Once the output current is determined, the controller 302 may send the calculated current to the valve 76 in block 1120 such that the left steering command valve 76 opens an amount corresponding to the output current to provide hydraulic fluid to actuate the left side actuator 56 and move the left rear caster wheel 44 in block 1122.

As the rear steering system is controlled according to blocks 1116 through 1122, the controller 302 is also able to control the front or differential primary steering system independently from the rear steering system. Moreover, the front or primary steering system may be controlled simultaneously or at a different time than the rear steering system. In FIGS. 11A-C, the front or primary steering system may include electric motors for rotatably driving the front wheels. Front steering gains may or may not be dependent on motor displacement. In any event, the controller 302 may calculate or lookup gains for electronic swash plate control for left and right pumps in block 1124. As it does, the right swash plate controller gain is greater than the left swash plate controller gain in block 1126. In block 1128, the right swash plate rotates more than the left swash plate such that the right motor is suppled more flow than the left motor in block 1130. Thus, the right front wheel spins or rotates faster than the left front wheel in block 1132. In combination with the control of the front and rear steering systems, the agricultural machine 20 is able to turn in the left direction in block 1134.

In the event the controller 302 determines in block 1136 that the operator wants to turn the vehicle to the right, the method 1100 may advance to block 1140 which is similar to block 1116. Here, the controller 302 may calculate or lookup a second steering gain value based on steering wheel rate. Here, the controller 302 may include one or more rear steering variable gain profiles similar to those shown in FIGS. 6-9 where the controller 302 determines the gain therefrom. Once the second gain is determined in block 1140, the method 1100 may advance to block 1142 where the controller 302 multiplies the two steering gains to determine an output current to the right steering command valve 78. Once the output current is determined, the controller 302 may send the calculated current to the valve 78 in block 1144 such that the right steering command valve 78 opens an amount corresponding to the output current to provide hydraulic fluid to actuate the right side actuator 58 and move the right rear caster wheel 46 in block 1146.

As the rear steering system is controlled according to blocks 1140 through 1146, the controller 302 is also able to control the front or primary differential steering system independently from the rear steering system. Here, the controller 302 may calculate or lookup gains for electronic swash plate control for left and right pumps in block 1148. As it does, the left swash plate controller gain is greater than the right swash plate controller gain in block 1150. In block 1152, the left swash plate rotates more than the right swash plate such that the left motor is suppled more flow than the right motor in block 1154. Thus, the left front wheel spins or rotates faster than the right front wheel in block 1156. In combination with the control of the front and rear steering systems, the agricultural machine 20 is able to turn in the left direction in block 1158.

Figure 12:
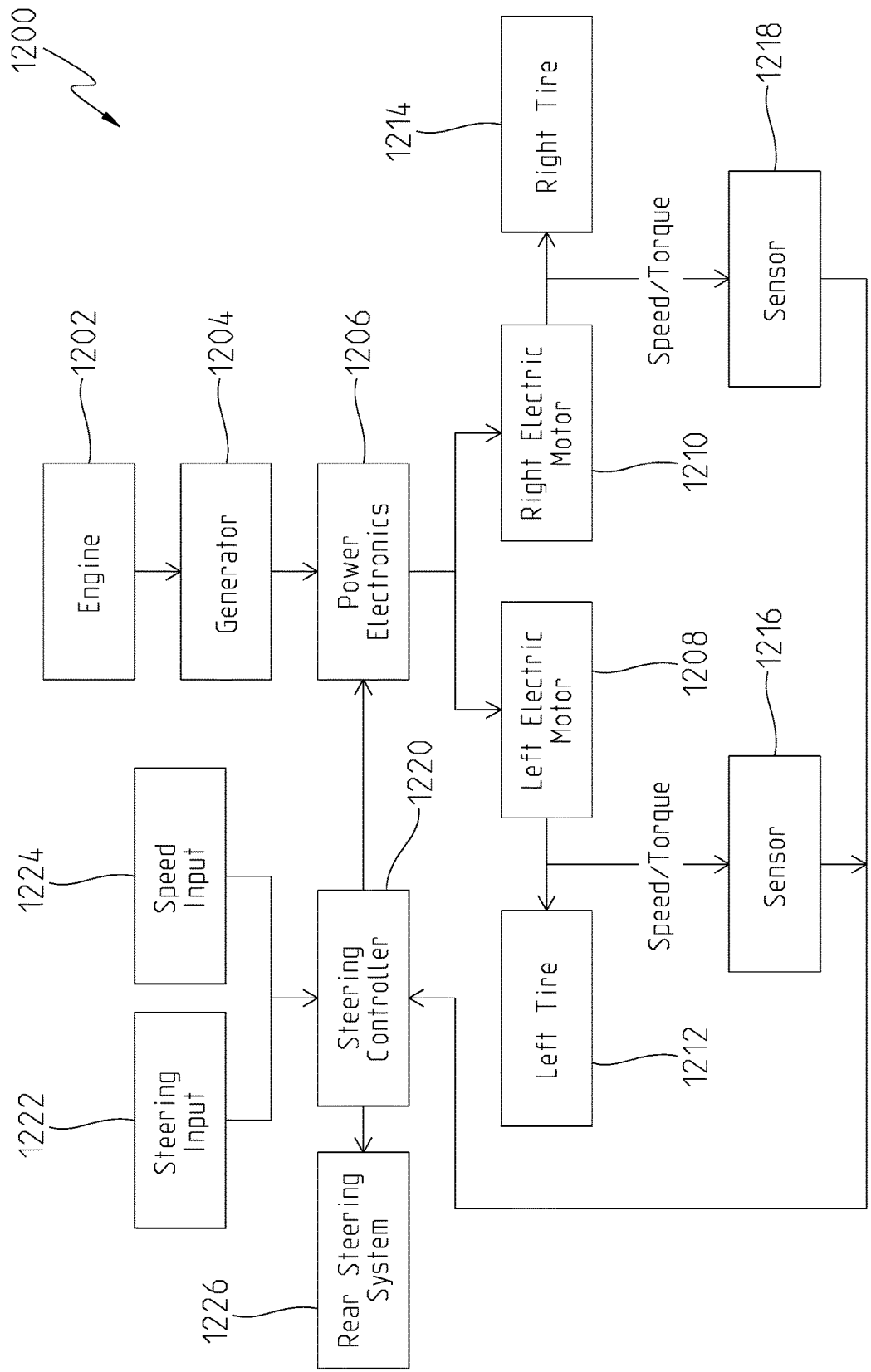
FIG. 12 is a schematic of a front steering system including an electrical control system.

Referring to FIG. 12, a further embodiment of the present disclosure is shown. Here, the first or primary steering system 1200 is shown as an electric control system. Here, for example, the engine or prime mover 1202 is able to produce and transfer power to an electric generator 1204. In turn, the generator 1204 feeds electric power to power electronics 1206. The power electronics 1206 may include speed and torque controllers for a first or left electric motor 1208 and a second or right electric motor 1210.

The first and second electric motors 1208, 1210 may be able to operably drive a first or left tire 1212 and a second or right tire 1214 of the vehicle. The first and second tires may correspond to the left front drive wheel 26 and the right front drive wheel 28 as shown in FIG. 1. In FIG. 1, the pair of front drive wheels are powered by hydraulic motors, whereas in FIG. 12 the pair of front wheels are powered by electric motors.

A first sensor 1216 may be in communication with the first electric motor 1208 for detecting a speed and torque value being output to the left tire 1212. Similarly, a second sensor 1218 may be in communication with the second electric motor 1210 for detecting a speed and torque value being output to the right tire 1214. The first and second sensors 1216, 1218 may be in electrical communication with a steering controller 1220 for outputting these values to the controller.

The steering controller 1220 may correspond to the controller 302 of FIG. 3. Alternatively, it may be a different controller. In any event, the steering controller 1220 may receive additional inputs from a steering input 1222 and a speed input 1224. The steering input 1222 may come from a steering wheel, joystick or other operator control for commanding a steer request. The speed input 1224 may come from a speed request from the operator. Here, the operator may command a vehicle speed request to achieve a desired vehicle speed, and the steering controller 1220 may receive this request.

Likewise, the steering controller 1220 may communicate with the second or rear steering system 1226 as shown in FIG. 12. In at least one embodiment, the steering controller 1220 may operably control the response of both the front and rear steering systems. In another embodiment, the steering controller 1220 may only control the front steering system and a second controller may control the rear steering system. As shown, the steering controller 1220 is in communication with the power electronics 1206 for controlling the output of the first and second electric motors 1208, 1210.

Figure 13A:
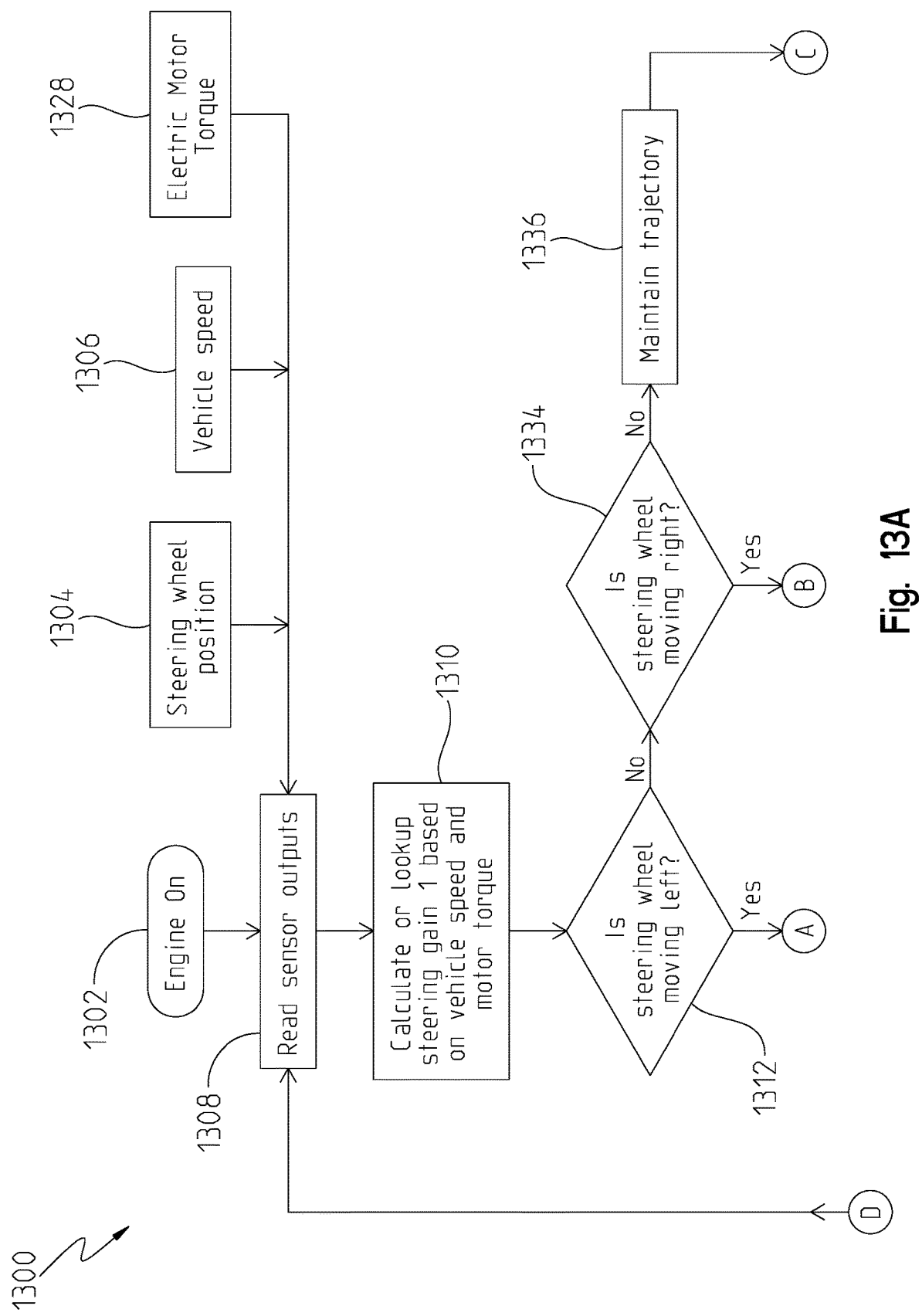

Turning to FIGS. 13A-C, another embodiment of a control method for controlling the steering of an agricultural machine is shown. Here, the method 1300 may include a plurality of blocks or steps which are executed to cause the machine to travel in a desired travel direction. The illustrated blocks or steps are not intended to be limiting, nor are they intended to illustrate a specific order in which each must be executed relative to the other blocks or steps. Further, in other embodiments of the method 1300, other blocks or steps may be executed to achieve the desired control. Moreover, in other embodiments of the method 1300, one or more of the illustrated blocks or steps may not be executed to achieve desired control Thus, the method 1300 of FIGS. 13A-C is not intended to be limiting but only illustrative of one example in which an agricultural machine may be controlled.

For sake of describing the control method 1300, the agricultural machine 20 of FIG. 1 includes the electric control system 1200 of FIG. 12. The controller 1220 may include a memory unit (not shown) for storing software, algorithms, control logic, look-up tables, graphs, calculations, and the like in order to execute the control method 1300. All or only a portion of the control method 1300 may be stored in the memory unit as control logic which is executable by a processor (not shown) of the controller 1220.

In a first block 1302 of the control method 1300, the controller 1220 may determine if the engine or prime mover 1202 is on. A steering wheel position may be detected by an operator steer input sensor 306 in block 1304 and a machine speed may be detected by a speed sensor 308 in block 1306. Further, in block 1328, electric motor torque detected by the first and second sensors 1216, 1218 may be communicated to the controller 1220. The controller 1220 may read sensor outputs from the operator steer input sensor 306, speed sensor 308, and first and second sensors 1216, 1218 in block 1308 of the method 1300. From the outputs, the controller 1220 may next calculate or lookup a first steering gain value in block 1310. The first steering gain value may be based solely off machine speed or a combination of machine speed and steering wheel position.

Once the first steering gain value is determined in block 1310, the method 1300 may advance to block 1312 where the controller 1220 determines if the steering wheel (i.e., operator steer input) is moving. For example, the controller 1220 may determine if the steering wheel is moving leftward or counterclockwise in block 1312. If not, the controller 1220 may determine if the steering wheel is moving in a second direction, e.g., rightward or clockwise, in block 1334. If the controller 1220 determines that the steering wheel is not moving in either the first or second direction in blocks 1312 and 1334, the method 1300 may advance to block 1336 and maintain the agricultural machine 20 in its current trajectory.

In the event the controller 1220 determines the operator is turning the steering wheel in the first direction in block 1312, the method may advance to block 1314 where the controller 1202 may calculate or lookup a second gain value based on steering wheel rate and motor torque. Here, the controller 1202 may include one or more blended, non-linear rear steering variable gain curves similar to those shown in FIGS. 6-9 where the controller 1202 determines the gain therefrom. Once the second gain is determined in block 1314, the method 1300 may advance to block 1316 where the controller 1202 multiplies the first gain value and the second gain value to determine an output current to the left steering command valve 76. Once the output current is determined, the controller 1202 may send the calculated current to the valve 76 in block 1318 such that the left steering command valve 76 opens an amount corresponding to the output current to provide hydraulic fluid to actuate the left side actuator 56 and move the left rear caster wheel 44 in block 1320.

As the rear steering system is controlled according to blocks 1314 through 1320, the controller 1202 is also able to control the front or primary steering system 1200 independently from the rear steering system. Moreover, the front or primary steering system 1200 may be controlled simultaneously or at a different time than the rear steering system. In FIGS. 13A-C, the front or primary steering system 1200 may include electric motors 1208, 1210 for rotatably driving the front wheels or tires 1212, 1214. Front steering gains may or may not be dependent on motor torque. In any event, the controller 1202 may calculate or lookup gains for electric motor speed control in block 1322. As it does, the right commanded speed is greater than the left commanded speed in block 1324. In block 1326, the right front wheel spins or rotates faster than the left front wheel. In combination with the control of the front and rear steering systems, the agricultural machine 20 is able to turn in the left direction in block 1332.

In the event the controller 1202 determines in block 1334 that the operator wants to turn the vehicle to the right, the method 1300 may advance to block 1338 where the controller 1202 may calculate or lookup a second gain value based on steering wheel rate and motor torque. Here, the controller 1202 may include one or more blended, non-linear rear steering variable gain curves similar to those shown in FIGS. 6-9 where the controller 1202 determines the gain therefrom. Once the second gain is determined in block 1338, the method 1300 may advance to block 1340 where the controller 1202 multiplies the first gain value and the second gain value to determine an output current to the right steering command valve 78. Once the output current is determined, the controller 1202 may send the calculated current to the valve 78 in block 1342 such that the right steering command valve 78 opens an amount corresponding to the output current to provide hydraulic fluid to actuate the right side actuator 58 and move the right rear caster wheel 46 in block 1344.

As the rear steering system is controlled according to blocks 1338 through 1344, the controller 1202 is also able to control the front or primary steering system 1200 independently from the rear steering system. Here, the controller 1202 may calculate or lookup gains for electric motor speed control in block 1346. As it does, the left commanded speed is determined to be greater than the right commanded speed in block 1348. In block 1350, the left front wheel spins or rotates faster than the right front wheel. In combination with the control of the front and rear steering systems, the agricultural machine 20 is able to turn in the right direction in block 1356.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A steering system for controlling an agricultural machine having a front traction mechanism and a pair of rear wheels, comprising:
   a controller;
   a steer input sensor in communication with a steer input and the controller, the steer input sensor configured to detect a change in the steer input corresponding to a steer command;
   a displacement input in communication with the controller for communicating a first motor displacement associated with a first operating mode and a second motor displacement associated with a second operating mode;
   a speed sensor for detecting a machine speed, the speed sensor disposed in communication with the controller;
   a primary differential steering system including a drive motor for operably controlling the front traction mechanism, the drive motor being selectively operable according to the first motor displacement and the second motor displacement; and
   a secondary steering system for operably controlling the pair of rear wheels, the secondary steering system comprising a first actuator for controlling a first rear wheel of the pair of rear wheels and a second actuator for controlling a second rear wheel of the pair of rear wheels;
   wherein, the controller determines if the motor displacement is being controlled according to the first motor displacement or the second motor displacement;
   further wherein, the controller outputs a control signal to operably actuate the first and second actuators as a function of the steer command, wherein the control signal comprises a rear steering gain that is a function of machine speed and either the first motor displacement or the second motor displacement.

2. The steering system of claim 1, wherein the controller outputs a second control signal to operably control the primary differential steering system based on the steer command.

3. The steering system of claim 2, wherein the primary differential steering system comprises:
   the front traction mechanism comprises a first front wheel and a second front wheel;
   a first pump and a first motor for operably controlling the first front wheel of the pair of front wheels;
   a second pump and a second motor for operably controlling the second front wheel of the pair of front wheels; and
   a mechanical mechanism for varying a displacement of the first and second pumps based on the second control signal.

4. The steering system of claim 2, wherein the primary differential steering system comprises:
   the traction mechanism comprises a first front wheel and a second front wheel;
   a first pump and a first motor for operably controlling the first front wheel of the pair of front wheels; and
   a second pump and a second motor for operably controlling the second front wheel of the pair of front wheels;
   wherein, the controller determines a gain for an electronic swash plate control for each of the first and second pumps;
   further wherein, the second control signal comprises a first portion of flow to the first motor and a second portion of flow to the second motor as a function of the gain.

5. The steering system of claim 1, wherein the first and second actuators are operably controlled independently from one another.

6. The steering system of claim 1, wherein the rear steering gain comprises a first linear steering gain profile and a second linear steering gain profile, the first linear steering gain profile associated with the first motor displacement and the second linear steering gain profile associated with the second motor displacement.

7. The steering system of claim 6, wherein:
   a slope of the first linear steering gain profile decreases as machine speed increases; and
   a slope of the second linear steering gain profile increases as machine speed increases.

8. The steering system of claim 1, wherein the rear steering gain comprises a first non-linear steering gain profile and a second non-linear steering gain profile, the first non-linear steering gain profile associated with the first motor displacement and the second non-linear steering gain profile associated with the second motor displacement.

9. The steering system of claim 8, wherein:
the rear steering gain decreases as machine speed increases according to the first non-linear steering gain profile; and
the rear steering gain increases as machine speed increases according to the second non-linear steering gain profile.

10. The steering system of claim 8, wherein the controller outputs a second control signal to operably control the primary differential steering system based on the steer command, the second control signal comprising a front steering gain that is a function of machine speed and either the first motor displacement or the second motor displacement;
further wherein, the front steering gain comprises a third non-linear steering gain profile and a fourth non-linear steering gain profile, the third non-linear steering gain profile associated with the first motor displacement and the fourth non-linear steering gain profile associated with the second motor displacement.

11. The steering system of claim 10, wherein, at any given machine speed, a slope of the first non-linear steering gain profile is approximately the same as a slope of the third non-linear steering gain profile, and a slope of the second non-linear steering gain profile is approximately the same as a slope of the fourth non-linear steering gain profile.

12. The steering system of claim 1, wherein the rear steering gain comprises a non-linear steering gain profile having a first portion and a second portion, the first portion associated with the first motor displacement and the second portion associated with the second motor displacement.

13. The steering system of claim 12, wherein the controller operably adjusts the rear steering gain between the first portion and the second portion at a pre-defined machine speed.

14. The steering gain of claim 12, wherein:
the rear steering gain decreases as machine speed increases according to the first portion of the non-linear steering gain profile; and
the rear steering gain increases as machine speed increases according to the second portion of the non-linear steering gain profile.

15. A steering system for controlling an agricultural machine having a front traction mechanism and a pair of rear wheels, comprising:
a controller configured to output a steer command;
a displacement input in communication with the controller for communicating a first motor displacement associated with a first operating mode and a second motor displacement associated with a second operating mode;
a speed sensor for detecting a machine speed, the speed sensor disposed in communication with the controller;
a primary differential steering system including a drive motor for operably controlling the front traction mechanism, the drive motor being selectively operable according to the first motor displacement and the second motor displacement; and
a secondary steering system for operably controlling the pair of rear wheels, the secondary steering system comprising a first actuator for controlling a first rear wheel of the pair of rear wheels and a second actuator for controlling a second rear wheel of the pair of rear wheels;
wherein, the controller determines if the motor displacement is being controlled according to the first motor displacement or the second motor displacement;
wherein, the controller outputs a first control signal to operably actuate the first and second actuators as a function of the steer command, wherein the control signal comprises a rear steering gain that is selected from a first steering gain profile or a second steering gain profile, the first and second rear steering profiles being a function of machine speed and either the first motor displacement or the second motor displacement;
further wherein, the controller outputs a second control signal to operably control the primary differential steering system based on the steer command.

16. The steering system of claim 15, wherein:
the first steering profile comprises a linear steering profile based on machine speed and the first motor displacement;
the second steering profile comprises a linear steering profile based on machine speed and the second motor displacement.

17. The steering system of claim 16, wherein:
a slope of the first steering profile decreases as machine speed increases; and
a slope of the second steering profile increases as machine speed increases.

18. The steering system of claim 17, wherein:
a slope of the first steering profile decreases as machine speed increases; and
a slope of the second steering profile increases as machine speed increases.

19. The steering system of claim 15, wherein the second control signal comprises a front steering gain that is a function of machine speed and either the first motor displacement or the second motor displacement;
further wherein, the front steering gain comprises a third non-linear steering gain profile and a fourth non-linear steering gain profile, the third non-linear steering gain profile associated with the first motor displacement and the fourth non-linear steering gain profile associated with the second motor displacement.

20. The steering system of claim 19, wherein, at any given machine speed, a slope of the first non-linear steering gain profile is approximately the same as a slope of the third non-linear steering gain profile, and a slope of the second non-linear steering gain profile is approximately the same as a slope of the fourth non-linear steering gain profile.

* * * * *